(12) United States Patent
Kawahara et al.

(10) Patent No.: US 10,209,875 B2
(45) Date of Patent: Feb. 19, 2019

(54) SCROLLING APPARATUS, SCROLLING METHOD, AND COMPUTER-READABLE MEDIUM

(71) Applicant: PANASONIC INTELLECTUAL PROPERTY CORPORATION OF AMERICA, Torrance, CA (US)

(72) Inventors: Noriyuki Kawahara, Kanagawa (JP); Takayuki Tanaka, Kanagawa (JP); Masatoshi Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 188 days.

(21) Appl. No.: 15/213,509

(22) Filed: Jul. 19, 2016

(65) Prior Publication Data

US 2016/0328109 A1 Nov. 10, 2016

Related U.S. Application Data

(63) Continuation of application No. 14/156,803, filed on Jan. 16, 2014, now Pat. No. 9,423,942.

(30) Foreign Application Priority Data

Jan. 18, 2013 (JP) .................. 2013-007502

(51) Int. Cl.
*G06F 3/048* (2013.01)
*G06F 3/0485* (2013.01)
(Continued)

(52) U.S. Cl.
CPC .......... *G06F 3/0485* (2013.01); *G06F 3/0488* (2013.01); *G06F 3/04842* (2013.01); *G06F 3/04845* (2013.01); *G06F 3/04883* (2013.01)

(58) Field of Classification Search
CPC ..... G06F 3/04845; G06F 3/0485; G06F 3/048
See application file for complete search history.

(56) References Cited

U.S. PATENT DOCUMENTS

| 6,714,221 | B1 | 3/2004 | Christie et al. |
| 2006/0125799 | A1* | 6/2006 | Hillis ............... G06F 3/011 |
| | | | 345/173 |

(Continued)

FOREIGN PATENT DOCUMENTS

| JP | 10-161628 | 6/1998 |
| JP | 2008-020406 | 1/2006 |

(Continued)

OTHER PUBLICATIONS

Japan Office action, dated Sep. 17, 2013, in Japan Patent Application No. 2013-007502, along with an english translation thereof.

*Primary Examiner* — Thanh T Vu
(74) *Attorney, Agent, or Firm* — Greenblum & Bernstein, P.L.C.

(57) ABSTRACT

An electronic apparatus includes a display that displays a content, and a detector that detects contactless proximity of an object to the display and contact of the object to the display. While the content scrolls on the display at gradually decreasing speeds, when the contactless proximity of the object to the display is detected and the contact of the object to the display is not detected, a scrolling speed of the content changes from the gradually decreasing speeds to a constant speed, which is faster than being stopped. After the scrolling speed of the content has changed to the constant speed, while the contactless proximity of the object to the display is detected and the contact of the object to the display is not detected, the content scrolls on the display at the constant speed.

20 Claims, 22 Drawing Sheets

(51) Int. Cl.
 *G06F 3/0484* (2013.01)
 *G06F 3/0488* (2013.01)

(56) References Cited

U.S. PATENT DOCUMENTS

| | | | |
|---|---|---|---|
| 2006/0161846 A1 | 7/2006 | Van Leeuwen | |
| 2011/0175829 A1 | 7/2011 | Miyazawa et al. | |
| 2011/0175830 A1* | 7/2011 | Miyazawa | G06F 1/1643 345/173 |
| 2012/0066638 A1* | 3/2012 | Ohri | G06F 3/0485 715/784 |
| 2012/0256856 A1 | 10/2012 | Suzuki et al. | |
| 2013/0104074 A1 | 4/2013 | Takahashi | |
| 2014/0022214 A1 | 1/2014 | Miyazawa et al. | |
| 2014/0176477 A1 | 6/2014 | Nakao | |
| 2014/0176510 A1 | 6/2014 | Nakao | |

FOREIGN PATENT DOCUMENTS

| | | |
|---|---|---|
| JP | 2007-328394 | 12/2007 |
| JP | 2009-260907 | 11/2009 |
| JP | 2011-150412 | 8/2011 |
| JP | 2011-150413 | 8/2011 |
| JP | 2012-14524 | 1/2012 |
| JP | 2012-221073 | 11/2012 |

\* cited by examiner

SCROLLING APPARATUS, SCROLLING METHOD, AND COMPUTER-READABLE MEDIUM

This application is a continuation of application Ser. No. 14/156,803, filed Jan. 16, 2014, which claims the benefit of Japanese Application No. 2013-007502, filed Jan. 18, 2013. The entire disclosures of the above-identified applications, including the specifications, drawings and claims are incorporated herein by reference in their entirety.

TECHNICAL FIELD

The present invention relates to a scrolling apparatus, a scrolling method, and a computer-readable medium storing a program for scrolling information displayed on a screen in response to a manipulation input through a touch panel.

DESCRIPTION OF RELATED ART

In recent years, electronic apparatus incorporating a touch panel have come into wide use. And touch panels which allow users to make intuitive manipulations have come to be used widely as devices through which electronic apparatus receive input manipulations. Touch panels enable, through the same screen, reception of an input manipulation made on the screen of a display unit (e.g., LCD (liquid crystal display) or organic EL (electroluminescence) device) of an electronic apparatus and display of a processing result of the electronic apparatus.

When a content is displayed that has such a large display size that the screen of an electronic apparatus incorporating a touch panel cannot fully display it, the user views the whole of the content by performing a scroll manipulation on the touch panel. For example, the electronic apparatus disclosed in JP-A-2012-14524 is known which can simplify a scroll manipulation.

In the electronic apparatus disclosed in JP-A-2012-14524, if it is judged that an object has been flick-manipulated by a finger, first inertial scrolling is performed in the direction of the flick manipulation. If it is judged that an object has been slide-manipulated by a finger and then flick-manipulated in the direction opposite to the direction of the slide manipulation, second inertial scrolling is performed in the direction of the flick manipulation. The second flick manipulation is longer in scroll distance or higher in scroll speed than the first flick manipulation. With these measures, in the electronic apparatus disclosed in JP-A-2012-14524, an object can be scrolled to a desired position in a simple manner without the need for repeating superfluous manipulations.

The inertial scrolling is a function that when quick scrolling has been performed on a screen, the scrolling is not stopped upon release of the finger from the screen but maintained for a prescribed time as if inertia were at work.

SUMMARY

However, in inertial scrolling, the scroll speed is decreased gradually as time elapses from release of the finger from the screen and the scrolling is stopped finally. This results in a problem that in the electronic apparatus of JP-A-2012-14524 the user needs to repeat manipulations for causing second scrolling when he or she wants to scroll a content having a large display size (e.g., map) quickly and continuously or view such a content continuously in a flowing state.

The present invention has been made in view of the above-described circumstances, and an object thereof is to provide a scrolling apparatus, a scrolling method, and a computer-readable medium storing a program which make it possible to easily scroll a content having a large display size without requiring repeated manipulations.

An aspect of the present invention provides a scrolling apparatus including: a display unit which displays a content on a screen; a contact detection unit which detects contact of a finger to the screen; a proximity detection unit which detects proximity of a finger to the screen; a scrolling control unit which scrolls the content displayed on the screen in response to a contact manipulation of the finger on the screen; and a display control unit which displays, on the screen, the scrolled content, wherein the scrolling control unit decelerates a scroll speed to a given speed if proximity of the finger to the screen is detected at or after a start of the scrolling.

With this configuration, the scrolling apparatus gradually decelerates the scroll speed to the given speed if proximity of the finger to the screen is detected at or after the start of the scrolling. Consequently, it is possible to easily scroll a content having a large display size without requiring repeated manipulations while proximity of the finger to the screen continues to be detected.

Another aspect of the present invention provides a scrolling method of a scrolling apparatus comprising a display unit which displays a content on a screen, the method including: detecting contact of a finger to the screen; detecting proximity of a finger to the screen; scrolling the content displayed on the screen in response to a contact manipulation of the finger on the screen; and displaying, on the screen, the scrolled content, wherein the scroll speed is decelerated to a given speed if proximity of a finger to the screen is detected at or after a start of the scrolling.

With this method, the scrolling apparatus gradually decelerates the scroll speed to the given speed if proximity of the finger to the screen is detected at or after the start of the scrolling. Consequently, it is possible to easily scroll a content having a large display size without requiring repeated manipulations while proximity of the finger to the screen continues to be detected.

Yet another aspect of the present invention provides a non-transitory computer-readable medium storing a program comprising instructions which, when executed by a computer, cause a scrolling apparatus comprising a display unit which displays a content on a screen to execute: detecting contact of a finger to the screen; detecting proximity of a finger to the screen; scrolling the content displayed on the screen in response to a contact manipulation of the finger on the screen; and displaying, on the screen, the scrolled content, wherein the scroll speed is decelerated to a given speed if proximity of a finger to the screen is detected at or after a start of the scrolling.

With this program stored in the computer-readable medium, the scrolling apparatus gradually decelerates the scroll speed to the given speed if proximity of the finger to the screen is detected at or after the start of the scrolling. Consequently, it is possible to easily scroll a content having a large display size without requiring repeated manipulations while proximity of the finger to the screen continues to be detected.

According to aspects of the present invention, it is possible to easily scroll a content having a large display size without requiring repeated manipulations.

DETAILED DESCRIPTION

Figure 1:
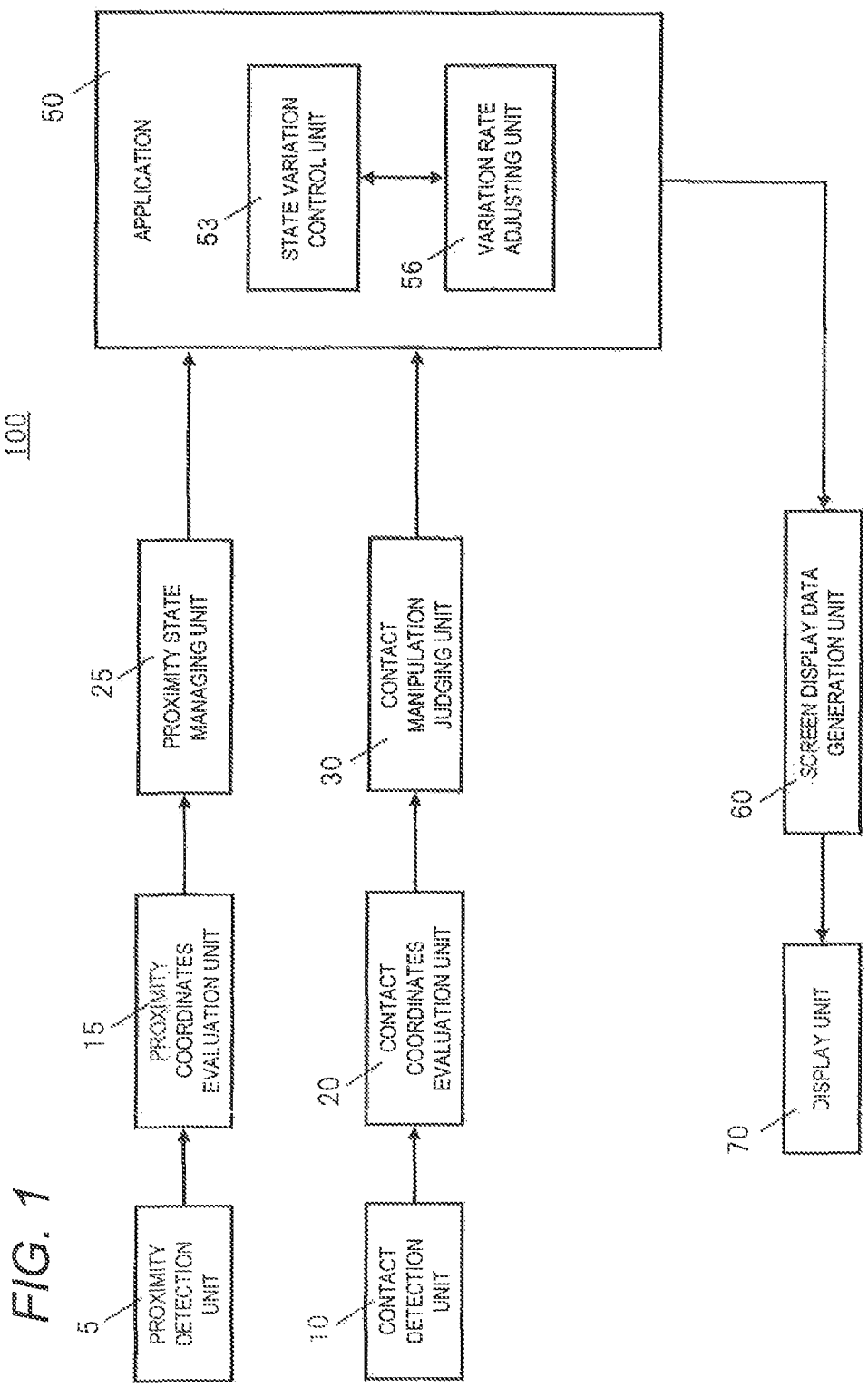
FIG. 1 is a block diagram showing the functional configuration of a portable terminal according to a first embodiment.

Scrolling apparatus, scrolling methods, and programs according to embodiments of the present invention will be hereinafter described with reference to the drawings. The scrolling apparatus according to the invention encompasses electronic apparatus incorporating a display unit for displaying data on the display screen, such as a cellphone, a smartphone, a tablet terminal, a digital still camera, a FDA (personal digital assistant), and an e-book terminal. A portable terminal (e.g., smartphone) will be described in each of the following embodiments as an example scrolling apparatus according to the invention.

The invention can be expressed as a scrolling apparatus as an apparatus or a program for causing a scrolling apparatus to operate as a computer. And the invention can also be expressed as a scrolling method including individual operations (steps) performed by a scrolling apparatus. That is, the invention can be expressed in any of the categories of an apparatus, a method, and a program.

Explanation of Terms Used in Embodiments

Although the following description will be made using a user finger (e.g., index finger) as a example object (indication medium) to come close to or into contact with a touch panel, the invention is not limited to such a case and but encompasses a case that a conductive stylus is used. No limitations are imposed on the object (indication medium) to come close to or into contact with a touch panel as long as its coming into proximity or contact to the touch panel can be detected according to the structure and detection method of the touch panel.

The two axes representing the horizontal surface of the touch panel will be referred to as the X axis and the Y axis, and the axis representing the direction perpendicular to the horizontal surface of the touch panel will be referred to as the Z axis.

In the following description, the term "contact coordinates" means coordinates (x, y) representing a position on the horizontal surface of the touch panel when the touch panel has detected contact of a finger and the term "proximity coordinates" means coordinates (x, y, z) representing a spatial position in a proximity detectable range when the touch panel has detected coming into proximity of a finger. The z coordinate of proximity coordinates (x, y, z) represents a height of a finger over the horizontal surface of the touch panel.

In the following description, the term "hover manipulation" is defined as a manipulation of placing a finger at a spatial position in a prescribed proximity detectable range over the surface of the touch panel. In particular, the term "hover slide manipulation" is defined as a manipulation which is an example hover manipulation and in which a finger is slid (moved) approximately parallel with the surface of the touch panel from a spatial position of a hover manipulation. And the term "hover hold manipulation" is defined as a manipulation of holding a finger in a proximity detectable range without moving it.

A manipulation of bringing a finger into direct contact with the surface of the touch panel is a "touch manipulation" rather than a "hover manipulation." The term "touch slide manipulation" is defined as a manipulation which is an example touch manipulation and in which a finger is slid (moved) across the surface of the touch panel while being kept in contact with it.

Furthermore, the term "flick manipulation" or "touch flick manipulation" is defined as a manipulation which is an example touch manipulation and in which a finger is flicked after making a touch manipulation on the surface of the touch panel. On the other hand, the term "hover flick manipulation" is defined as a manipulation which is an example hover manipulation and in which as in a flick manipulation a finger is flicked in a prescribed proximity detectable range that is spaced from the surface of the touch panel. In the following description, the "touch flick manipulation" and the "hover flick manipulation" will be discriminated from each other.

In the prescribed proximity detectable range for detection of a hover manipulation, the distance between a finger and the surface of the touch panel is inversely proportional to the capacitance detected by the touch panel. It is therefore preferable that the prescribed proximity detectable range correspond to a detectable capacitance range of the touch panel.

When a finger enters the prescribed proximity detectable range of the touch panel, the touch panel detects the coming into proximity of the finger. The term "hovering-in" is defined as a manipulation for causing a start of detection of a proximity state of a finger by moving the finger from a position higher than the proximity detectable range of the touch panel to a height within it. And the term "hovering-out" is defined as a manipulation for rendering a proximity state of a finger no longer detectable by moving the finger away from the touch panel from a height within the proximity detectable range to a position higher than it.

The term "inertial scrolling" is defined as scrolling in which the scroll speed is decreased gradually to zero from a peak speed which is an initial scroll speed attained by an initial manipulation (e.g., touch flick manipulation) for starting the scrolling.

Embodiment 1 in a portable terminal 100 according to a first embodiment, after inertial scrolling was started by a finger contact manipulation (e.g., touch flick manipulation), while a finger hover manipulation (e.g., hover hold manipulation) continues to be detected, the inertial scrolling is suspended to keep the scroll speed time-varying rate (described later) equal to zero. The scrolling is thereby performed in such a manner that a scroll speed and a scroll direction at the time of detection of the finger hover manipulation are maintained.

Functional Configuration of Portable Terminal 100 According to Embodiment 1

First, the functional configuration of the portable terminal 100 according to the first embodiment will be described with reference to FIG. 1. FIG. 1 is a block diagram showing the functional configuration of the portable terminal 100 according to the first embodiment. The portable terminal 100 shown in FIG. 1 includes a proximity detection unit 5, a contact detection unit 10, a proximity coordinates evaluation unit 15, a contact coordinates evaluation unit 20, a proximity state managing unit 25, a contact manipulation judging unit 30, an application 50, a display screen data generation unit 60, and a display unit 70. The application 50 as a scrolling control unit includes a state variation control unit 53 and a variation rate adjusting unit 56.

The proximity detection unit 5 detects at a predetermined cycle whether or not a finger FG of the user of the portable terminal 100 is close to a touch panel TP. The proximity detection unit 5 detects proximity of a finger FG to the touch panel TP when, for example, a hover manipulation (e.g., hover slide manipulation, hover hold manipulation, or hover flick manipulation) has been made by the finger FG. The proximity detection unit 5 outputs, to the proximity coordinates evaluation unit 15, a proximity detection signal to the effect that a finger FG is close to the touch panel TP.

The contact detection unit 10 detects at a predetermined cycle whether or not a finger FG of the user of the portable terminal 100 is in contact with the touch panel TP. The contact detection unit 10 detects coming into contact of a finger FG to the touch panel TP when, for example, a touch manipulation (e.g., touch slide manipulation or touch flick manipulation) has been made by the finger FG. The contact detection unit 10 outputs, to the contact coordinates evaluation unit 20, a contact detection signal to the effect that a finger FG is in contact with the touch panel TP.

The proximity detection unit 5 and the contact detection unit 10 can be formed by using the touch panel TP. Although the proximity detection unit 5 and the contact detection unit 10 are separate units in FIG. 1, they may be formed as a single unit using the touch panel TP.

The proximity coordinates evaluation unit 15 calculates proximity coordinates (x, y, z) of the finger FG on or with respect to the touch panel TP on the basis of a proximity detection signal that is output from the proximity detection unit 5, and outputs them to the proximity state managing unit 25. The x and y components of the proximity coordinates (x, y, z) represent a position on the surface of the touch panel TP, and their a component represents a distance between the finger FG and the touch panel TP in the Z-axis direction, that is, a height of the finger FG with respect to the touch panel TP.

The contact coordinates evaluation unit 20 calculates contact coordinates (x, y) where the finger FG has come into contact with the touch panel TP on the basis of the contact detection signal that is output from the contact detection unit 10, and outputs them to the contact manipulation judging unit 30.

The proximity state managing unit 25 manages a proximity/non-proximity state indicating whether or not the finger FG is close to the touch panel TP on the basis of the proximity coordinates (x, y, z) that are output from the proximity coordinates evaluation unit 15. For example, the proximity state managing unit 25 detects that the finger FG has hovered in when the finger FG has moved from a position outside the proximity detectable range of the touch panel TP to a position inside it. And the proximity state managing unit 25 detects that the finger FG has hovered out when the finger FG has moved from a position inside the proximity detectable range of the touch panel TP to a position outside it. The proximity state managing unit 25 informs an application 50 of a proximity/non-proximity state indicating whether or not the finger FG is close to the proximity detectable range.

The contact manipulation judging unit 30 judges a type of a touch manipulation made by the finger FG on the touch panel TP on the basis of contact coordinates (x, y) that are output from the contact coordinates evaluation unit 20. Example touch manipulation types to be decided on by the contact manipulation judging unit 30 are a touch manipulation, a touch slide manipulation, and a touch flick manipulation. However, the touch manipulation type is not limited to them. The contact manipulation judging unit 30 informs the application 50 of the determined touch manipulation type, that is, a judgment result that a touch manipulation of one of the above types has been performed.

Furthermore, if, for example, a touch flick manipulation has been made by the finger FG, the contact manipulation judging unit 30 calculates a movement speed at which the finger FG has been flicked on the surface of the touch panel TP on the basis of contact coordinates (x, y) that are output from the contact coordinates evaluation unit 20 and informs the application 50 of the calculated movement speed.

The contact manipulation judging unit 30 may calculate a movement speed of the finger FG of a touch flick manipulation using both of the proximity coordinates (x, y, z) calculated by the proximity coordinates evaluation unit 15 and the contact coordinates (x, y) calculated by the contact coordinates evaluation unit 20. This allows the contact manipulation judging unit 30 to calculate, with high accuracy, a movement speed at which the finger FG has been flicked on the surface of the touch panel TP.

The application 50 is an application program that is preinstalled in the portable terminal 100. No limitations are imposed on the details of the application used in each embodiment. For example, the application 50 is a map application for displaying a corresponding map content on the display unit 70 according to a user input manipulation.

The state variation control unit 53 calculates an initial scroll speed according to a movement speed at which the finger FG has been flicked on the surface of the touch panel TP when the touch manipulation judged by the contact manipulation judging unit 30 is the touch flick manipulation. The state variation control unit 53 determines a scroll speed vs. time characteristic using the initial scroll speed and a scroll speed time-varying rate (e.g., acceleration (this also applies to the following description)) of inertial scrolling, and performs inertial scrolling according to the determined characteristic.

The acceleration (<0) which is an example scroll speed time-varying rate is known in the state variation control unit 53 and corresponds to a friction coefficient for lowering the scroll speed of inertial scrolling as time elapses. The scroll speed time-varying rate may be fixed to a certain value irrespective of the lapse of time or decrease from an initial value as time elapses.

Figure 2:
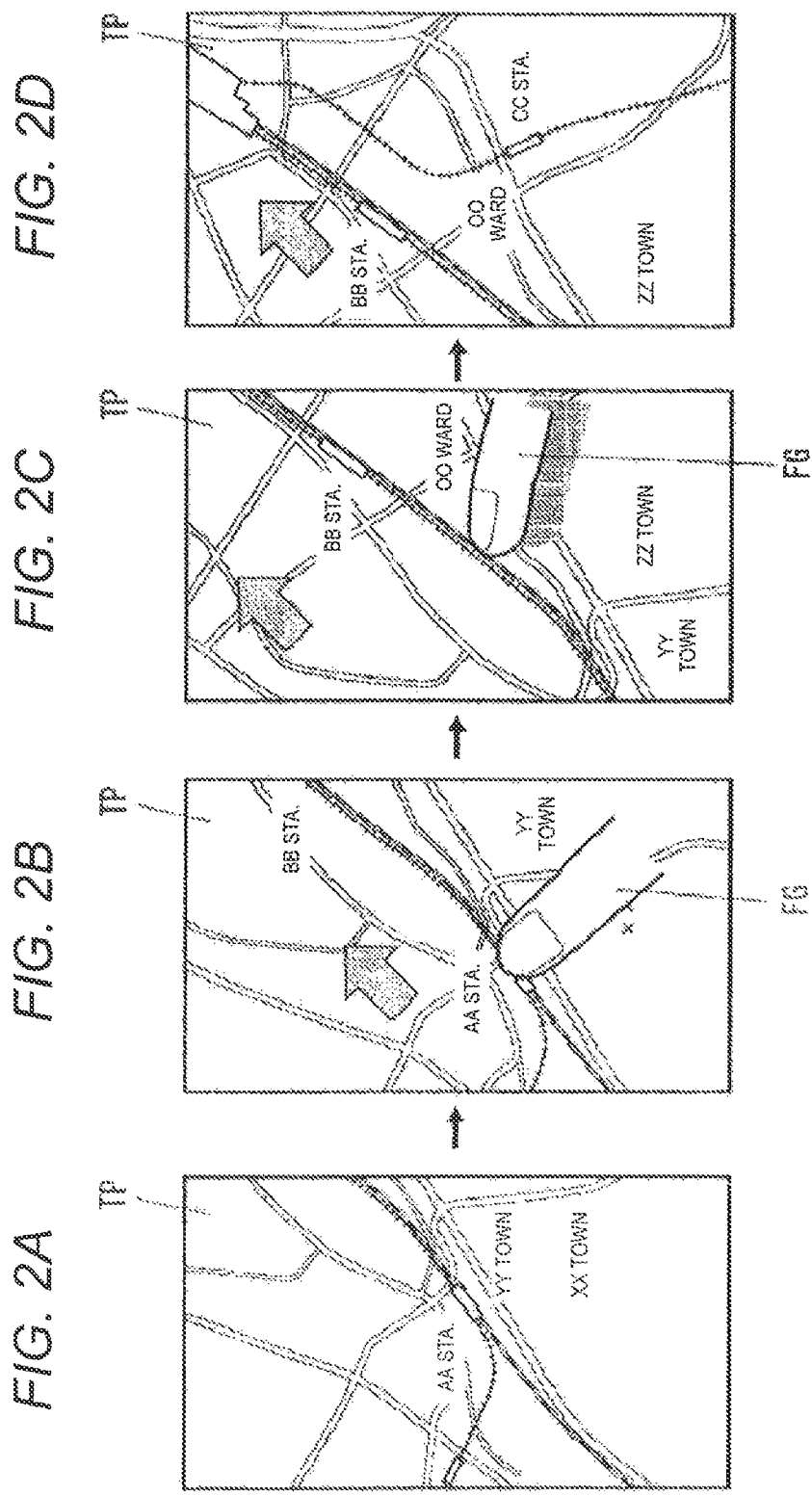
FIGS. 2A-2D are schematic diagrams outlining how the portable terminal according to the first embodiment operates.

The state variation control unit 53 starts to inertial-scroll, for example, a map content displayed on the screen of the display unit 70 according to the calculated initial scroll speed and the determined scroll speed time-varying rate (see FIG. 2B). Therefore, in a case that inertial scrolling is continued, the scroll speed is decreased gradually to zero (the inertial scrolling is finished) from a peak speed which is an initial scroll speed attained by a touch flick manipulation as time elapses from the touch flick manipulation (see a scroll curve C0 shown in FIG. 3).

When hovering-in of the finger FG is detected by the proximity state managing unit 25, the variation rate adjusting unit 56 instructs the state variation control unit 53 to set the scroll speed time-varying rate to zero. In response to the instruction from the variation rate adjusting unit 56, the state variation control unit 53 changes the scroll speed time-varying rate to zero. In this manner, the state variation control unit 53 suspends the inertial scrolling and thereafter performs scrolling in such a manner that a scroll speed and a scroll direction of the inertial scrolling at the time of detection of the hovering-in of the finger FG are maintained.

When hovering-out of the finger FG is detected by the proximity state managing unit 25, the variation rate adjusting unit 56 instructs the state variation control unit 53 to change the scroll speed time-varying rate to the original value, that is, the scroll speed time-varying rate of the inertial scrolling at the time of the detection of the hovering-in of the finger FG by the proximity state managing unit 25. The state variation control unit 53 changes the scroll speed time-varying rate to the original value in response to the instruction from the variation rate adjusting unit 56. In this manner, the state variation control unit 53 can restart inertial scrolling from the scroll speed at the time of the detection of hovering-in of the finger FG.

The display screen data generation unit 60 as a display control unit generates pre-scrolling or post-scrolling display screen data of the application 50 and displays it on the display unit 70. Although in FIG. 1 the display screen data generation unit 60 is separate from the application 50, it may be included in the application 50.

Having a function of displaying data on the screen, the display unit 70 displays display screen data that is output from the display screen data generation unit 60. The display screen data is data that is displayed on the display unit 70 while the application 50 is run.

Outline of Operation of Embodiment 1

Next, how the portable terminal 100 according to this embodiment operates will be outlined with reference to FIGS. 2A-2D. FIGS. 2A-2D are schematic diagrams outlining how the portable terminal 100 according to the first embodiment operates.

FIG. 2A shows a map content of the application 50 that is displayed on the screen of the display unit 70. The touch panel TP is provided adjacent to the screen of the display unit 70. For example, if a touch flick manipulation is performed on the touch panel TP up rightward by a finger FG, the portable terminal 100 starts to inertial-scroll the map content in the movement direction of the finger FG of the touch flick manipulation (see FIG. 2B). FIG. 2B shows that the portable terminal 100 starts the inertial scrolling in a direction which is the same as that of the touch flick manipulation performed by the finger FG.

If detecting that the finger FG has hovered in as a result of a hover manipulation performed after the touch flick manipulation, the portable terminal 100 changes the scroll speed time-varying rate of the inertial scrolling to zero to suspend the inertial scrolling. Furthermore, the portable terminal 100 performs scrolling in such a manner that a scroll speed and a scroll direction at the time of the detection of the hovering-in of the finger FG are maintained (see FIG. 2C). FIG. 2C shows that scrolling is performed such that the scroll speed and the scroll direction are maintained to be constant as a result of a hover manipulation by the finger FG to the touch panel TP. As a result, while the finger FG continues a hover hold manipulation, the portable terminal 100 can maintain the scroll speed and a scroll direction at the time of the detection of the hovering-in of the finger FG. Repeated manipulations for scrolling are not necessary and the map content can be scrolled quickly.

When the finger FG that has continued the hover manipulation leaves the proximity detectable range of the touch panel TP and the portable terminal 100 thereby detects hovering-out of the finger FG, the portable terminal 100 changes the scroll speed time-varying rate to the original value and restarts inertial scrolling (see FIG. 2D). FIG. 2D shows that the hovering-out is detected as a result of motion of the finger FG away from the proximity detectable range of the touch panel TP.

Operation of Portable Terminal 100 According to Embodiment 1

Figure 3:
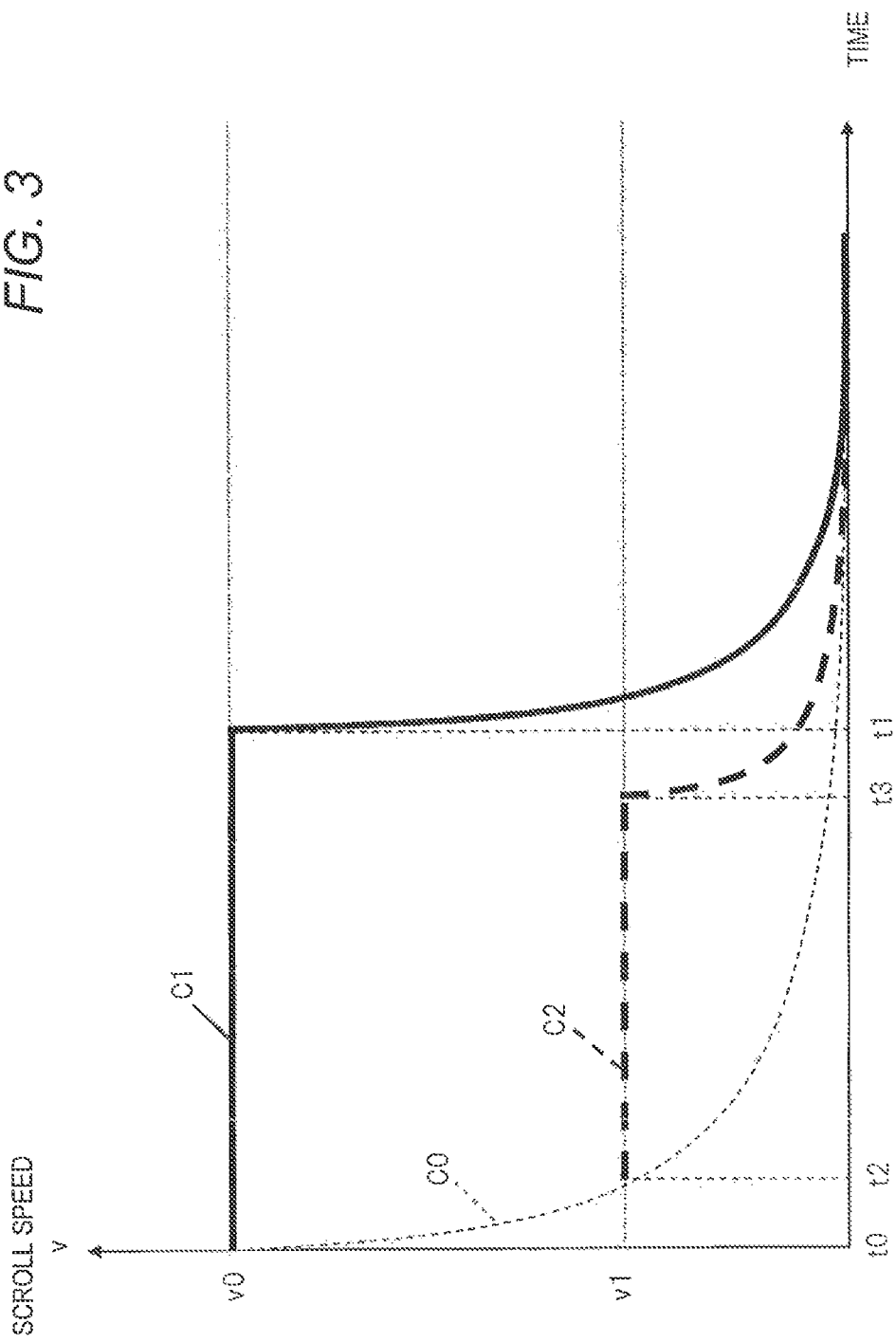
FIG. 3 is a graph showing how the scroll speed is varied with time in the first embodiment.
Figure 4:
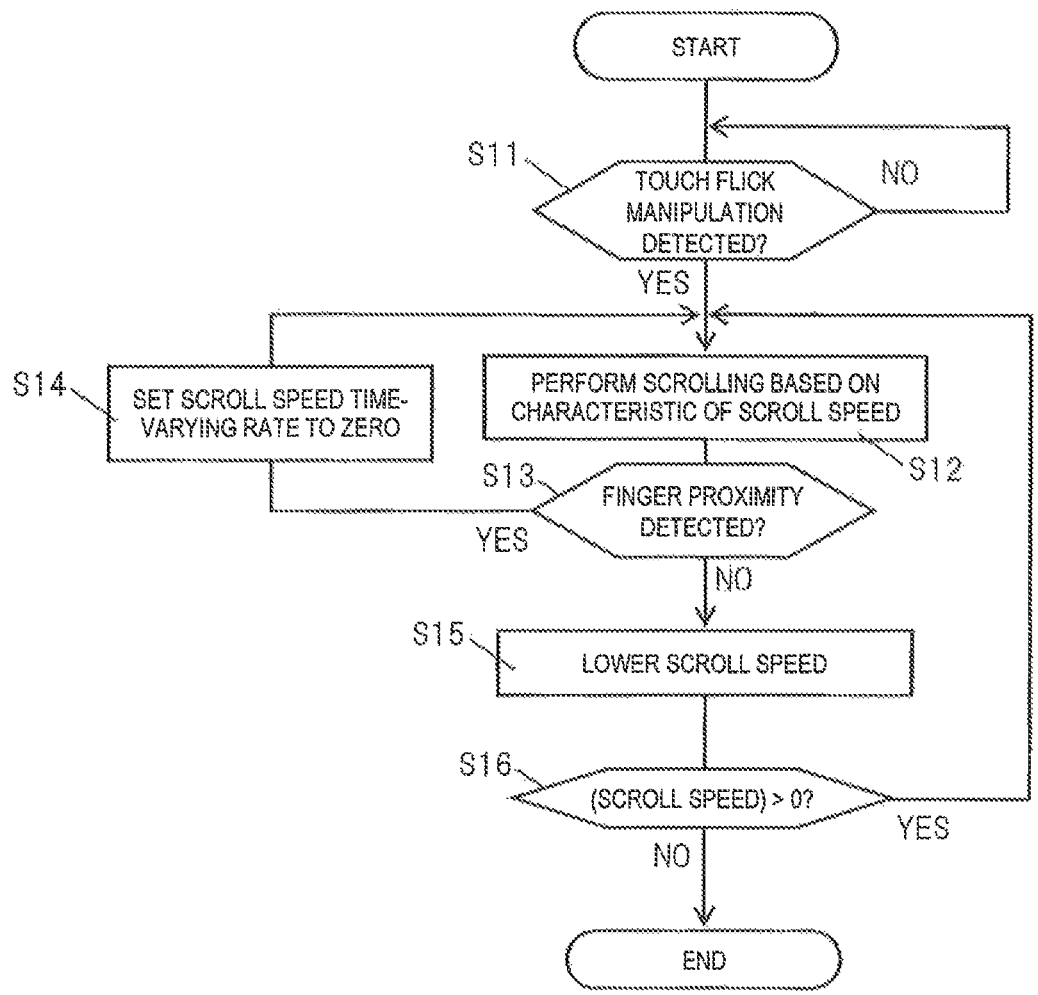
FIG. 4 is a flowchart showing how the portable terminal according to the first embodiment operates.

Next, how the portable terminal 100 according to this embodiment operates will be described with reference to FIGS. 3 and 4. FIG. 3 is a graph showing how the scroll speed is varied with time in the first embodiment. FIG. 4 is a flowchart showing how the portable terminal 100 according to the first embodiment operates.

In FIG. 3, time t0 is a time when a touch flick manipulation is performed, time t1 and time t3 are times when hovering-out, is detected, and time t2 is a time when hovering-in of a finger FG is detected.

FIG. 3 shows three scroll curves C0, C1, and C2. The scroll curve C0 corresponds to conventional inertial scrolling. That is, as time elapses from time t0, the scroll speed v is decreased gradually to zero (the inertial scrolling is finished) from a peak speed which is an initial scroll speed v0 at time t0.

The scroll curve C1 is a scroll curve of a case that a touch flick manipulation and hovering-in are detected simultaneously at time t0. In the scroll curve C1, since a touch flick manipulation and hovering-in are detected simultaneously at time t0, from time t0 to time t1 and constant-speed scrolling is performed instead of inertial scrolling, that is, the scroll speed v is kept equal to the initial scroll speed v0. Since hovering-out is detected at time t1, at time t1 the constant-speed scrolling is stopped and inertial scrolling is started. As a result, as in the scroll curve C0, the scroll speed v is decreased gradually to zero (the inertial scrolling is finished).

The scroll curve C2 is a scroll curve of a case that a touch flick manipulation is detected at time t0 and hovering-in is detected at time t2. In the scroll curve C2, since hovering-in is detected at time t2, a stroke speed that is equal to a scroll speed v1 of inertial scrolling at time t2 is maintained from time t2 to t3. Since hovering-out is detected at time t3, at time t3 the constant-speed scrolling is stopped and inertial scrolling is restarted. As a result, as in the scroll curve C0, the scroll speed v is decreased gradually to zero (the inertial scrolling is finished).

Referring to FIG. 4, at step S11, the contact manipulation judging unit 30 judges, on the basis of contact coordinates (x, y) that are output from the contact coordinates evaluation unit 20, a type of a touch manipulation that has been performed by a finger FG on the touch panel TP (S11). If judging that the type of the touch manipulation is a touch flick manipulation (S11: yes), the contact manipulation judging unit 30 informs the application 50 that a touch flick manipulation has been made.

If a touch flick manipulation has been performed by a finger FG, the contact manipulation judging unit 30 calculates a movement speed at which the finger FG was flicked on the surface of the touch panel TP on the basis of contact coordinates (x, y) that are output from the contact coordinates evaluation unit 20 and informs the application 50 of the calculated movement speed.

At step S12, the state variation control unit 53 calculates an initial scroll speed of inertial scrolling according to the movement speed of the finger FG that is output from the contact manipulation judging unit 30. The state variation control unit 53 determines a scroll speed vs. time characteristic using the initial scroll speed and a scroll speed time-varying rate of inertial scrolling, and starts inertial scrolling according to the determined characteristic.

At step S13, the proximity state managing unit 25 detects whether or not the finger FG is close to the touch panel TP on the basis of proximity coordinates (x, y, z) that are output from the proximity coordinates evaluation unit 15. If detecting that the finger FG has hovered in (S13: yes), the proximity state managing unit 25 informs the application 50 that the finger FG has hovered in.

At step S14, in response to the notice sent from the proximity state managing unit 25, the variation rate adjusting unit 56 instructs the state variation control unit 53 to set the scroll speed time-varying rate to zero. Following the instruction from the variation rate adjusting unit 56, the state variation control unit 53 changes the scroll speed time-varying rate to zero. Thus, at step S12, the state variation control unit 53 suspends the inertial scrolling and performs scrolling in such a manner that a scroll speed and a scroll direction at the time of the detection of the hovering-in the finger FG are maintained.

On the other hand, if detecting that the finger FG has hovered out (S13: no), the proximity state managing unit 25 informs the application 50 that the finger FG has hovered out. At step S15, in response to the notice sent from the proximity state managing unit 25, the variation rate adjusting unit 56 instructs the state variation control unit 53 to change the scroll speed time-varying rate to the original value. Following the instruction from the variation rate adjusting unit 56, the state variation control unit 53 changes the scroll speed time-varying rate to the original value. Thus, at step S12, the state variation control unit 53 restarts inertial scrolling from the scroll speed at the time of the detection of the hovering-in. Therefore, the scroll speed is decreased gradually as time elapses from the scroll speed at the time of the detection of the hovering-in.

At step S16, the state variation control unit 53 judges whether the scroll speed is higher than zero. If judging that the scroll speed is higher than zero (S16: yes), at step S12 the state variation control unit 53 performs scrolling at the scroll speed that was set at step S15. On the other hand, if judging that the scroll speed is lower than or equal to zero (actually, equal to zero) (S16: no), the scrolling of the portable terminal 100 is finished.

In the above-described process, in the portable terminal 100 according to the embodiment, if hovering-in of a finger FG is detected after inertial scrolling was started in response to a touch flick manipulation made by the finger FG, the inertial scrolling is suspended and scrolling is performed in such a manner that a scroll speed and a scroll direction of the inertial scrolling at the time of the detection of the hovering-in by the proximity state managing unit 25 are maintained.

As a result, in the portable terminal 100 according to the embodiment, a scroll speed and a scroll direction at the time of detection of hovering-in of a finger FG can be maintained while the finger FG continues a hover hold manipulation, for example. This makes it possible to scroll a map content quickly. That is, the portable terminal 100 can scroll a content having a large display size in a simple manner, that is, without requiring repeated manipulations for causing inertial scrolling plural times.

In the portable terminal 100 according to the embodiment, although not shown in FIGS. 3 and 4, if hovering-in is detected again after detection of hovering-out, scrolling may be performed in such a manner that a scroll speed and a scroll direction of inertial scrolling at the time of the detection of the hovering-in are maintained.

In the portable terminal 100 according to the embodiment, if a hover flick manipulation is detected while a finger FG is continuing a hover hold manipulation, constant-speed scrolling may be performed at a speed that is made higher than a constant scroll speed that was set when hovering-in was detected by a value corresponding to a movement speed of the finger FG of the hover flick manipulation. With this measure, in the portable terminal 100, if a scroll speed that is set when hovering-in is detected is not preferable to the user, the user can cause Scrolling at a proper scroll speed that is determined by a hover flick manipulation made by the user.

Embodiment 2

In a portable terminal 200 according to a second embodiment, after inertial scrolling was started by a finger contact manipulation (e.g., touch flick manipulation), while a finger hover manipulation continues to be detected, the inertial scrolling is suspended and the scroll speed is decreased gradually until reaching a given (e.g., prescribed) convergence speed (described later), and, after that, scrolling is performed at the constant, convergence speed.

Functional Configuration of Portable Terminal 200 According to Embodiment 2

Figure 5:
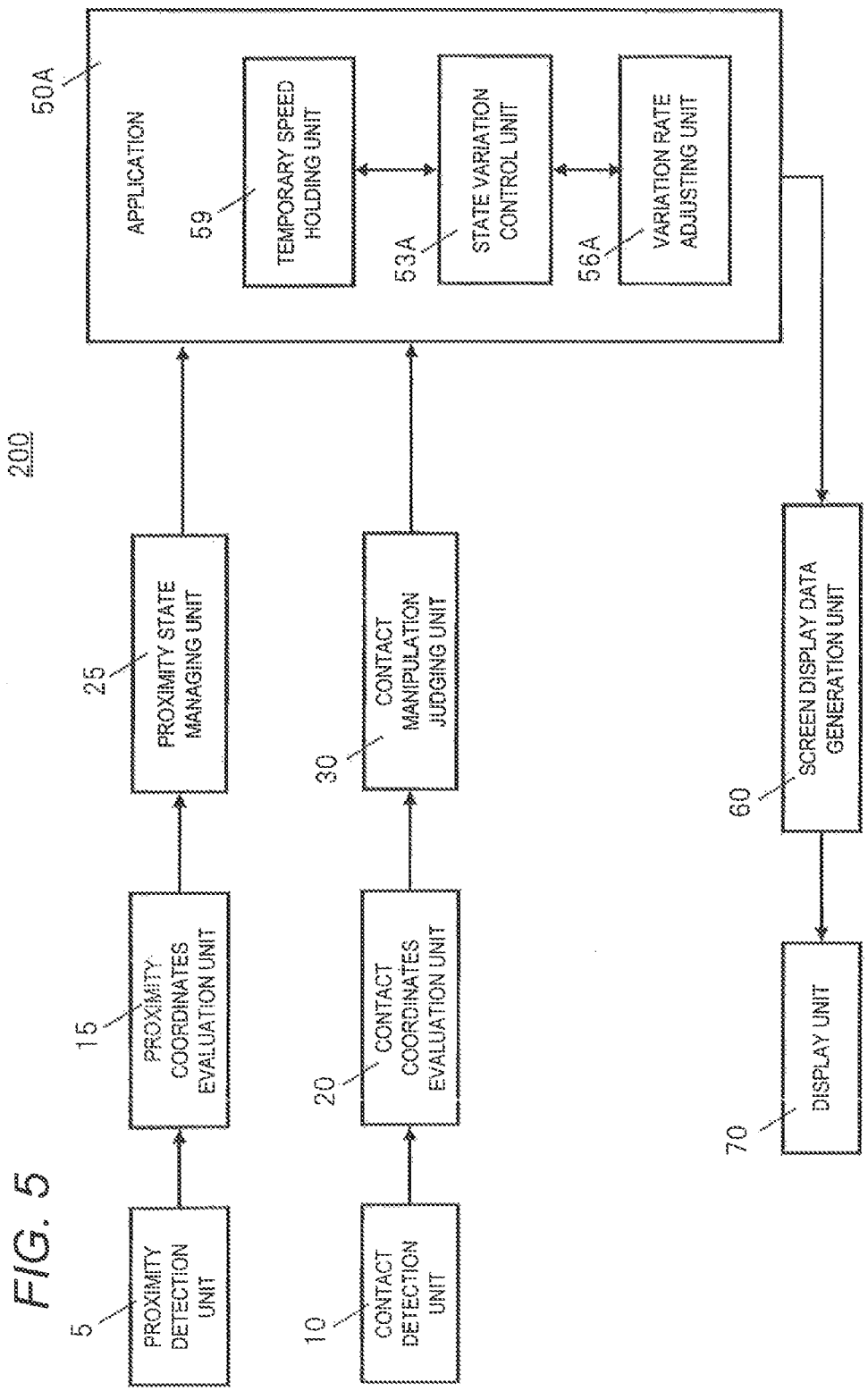
FIG. 5 is a block diagram showing the functional configuration of a portable terminal according to a second embodiment.

The functional configuration of the portable terminal 200 according to the second embodiment will be described with reference to FIG. 5. FIG. 5 is a block diagram showing the functional configuration of the portable terminal 200 according to the second embodiment. The portable terminal 200 shown in FIG. 5 includes a proximity detection unit 5, a contact detection unit 10, a proximity coordinates evaluation unit 15, a contact coordinates evaluation unit 20, a proximity state managing unit 25, a contact manipulation judging unit 30, an application 50A, a display screen data generation unit 60, and a display unit 70. The application 50A as a scrolling control unit includes a state variation control unit 53A, a variation rate adjusting unit 56A, and a temporary speed holding unit 59. In the description of the individual units of the portable terminal 200 shown in FIG. 5, units having the same ones in the portable terminal 100 shown in FIG. 1 will be given the same reference symbols as the latter and descriptions therefor will be simplified or omitted. That is, only different units will be described in detail.

The state variation control unit 53A calculates a convergence speed on the basis of an initial scroll speed of inertial scrolling, and stores it in the temporary speed holding unit 59. The convergence speed is a lower limit scroll speed of scrolling that is performed after detection of hovering-in of a finger FG (this also applies to each of the following embodiments). The convergence speed may either be set according to an initial scroll speed of inertial scrolling or be set to a fixed value irrespective of an initial scroll speed of inertial scrolling. This embodiment and each of the following embodiments will be described with an assumption that the convergence speed is equal to a value that is calculated by the state variation control unit 53A according to an initial scroll speed of inertial scrolling (e.g., ½ of an initial scroll speed of inertial scrolling).

Upon detection of hovering-in of a finger FG, the variation rate adjusting unit 56A instructs the state variation control unit 53A to change the scroll speed time-varying rate so that the scroll speed will converge on the convergence speed stored in the temporary speed holding unit 59. In response to the instruction from the variation rate adjusting unit 56A, the state variation control unit 53A changes the scroll speed time-varying rate. In this manner, the state variation control unit 53A suspends the inertial scrolling and performs scrolling so that the scroll speed will converge on the convergence speed. Therefore, in the portable terminal 200 according to this embodiment, while a hover manipulation of a finger FG continues to be detected, scrolling can be performed in such a manner that the scroll speed do not become lower than the convergence speed.

Operation of Portable Terminal 200 According to Embodiment 2

Figure 6:
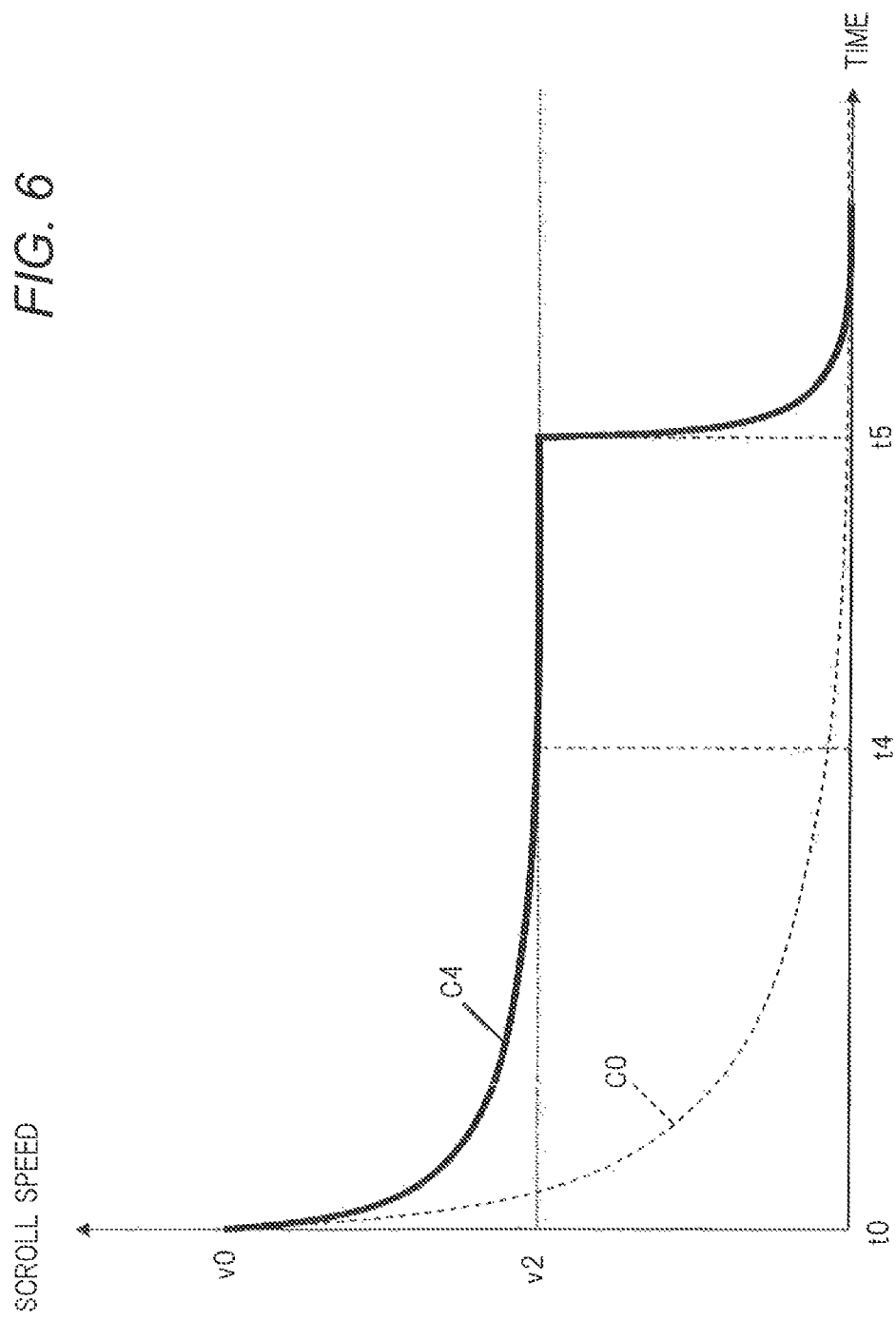
FIG. 6 is a graph showing how the scroll speed is varied with time in the second embodiment.
Figure 7:
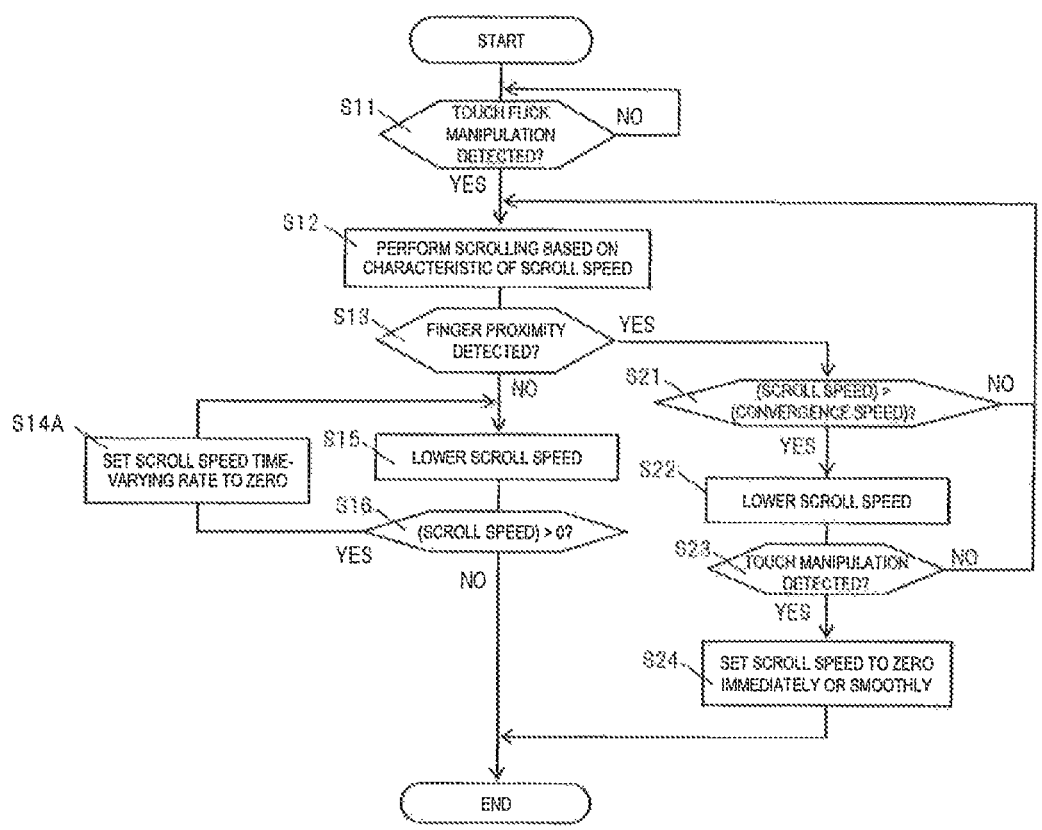
FIG. 7 is a flowchart showing how the portable terminal according to the second embodiment operates.

Next, how the portable terminal 200 according to this embodiment operates will be described with reference to FIGS. 6 and 7. FIG. 6 is a graph showing how the scroll speed is varied with time in the second embodiment. FIG. 7 is a flowchart showing how the portable terminal 200 according to the second embodiment operates.

In FIG. 6, time t0 is a time when a touch flick manipulation and hovering-in are detected simultaneously, time t4 is a time when the scroll speed v becomes equal to a convergence speed v2, and time t5 is a time when hovering-out is detected. Since the scroll curve C0 is the same as shown in FIG. 3 and hence will not be described.

In the description of the flowchart of FIG. 7, steps having the same ones in the flowchart of FIG. 4 will be given the same reference symbols as the latter and descriptions therefor will be simplified or omitted. Only different steps will be described in detail.

In a scroll curve C4, at time t0, a touch flick manipulation and hovering-in are detected simultaneously and hence inertial scrolling is not performed. From time t0 to time t4, the scroll speed v is decreased gradually. From time t4 when the scroll speed v becomes equal to the convergence speed v2 to time t5, the scroll speed v is kept equal to the convergence speed v2. Since hovering-out is detected at time t5, at time t5 inertial scrolling is started. As a result, as in the scroll curve C0, the scroll speed v is decreased gradually from the convergence speed v2 to zero (the inertial scrolling is finished).

Referring to FIG. 7, if detecting that the finger FG has hovered in (S13: yes), the proximity state managing unit 25 informs the application 50A that the finger FG has hovered in. The variation rate adjusting unit 56A instructs the state variation control unit 53A to change the scroll speed time-varying rate so that the scroll speed v will converge on the convergence speed stored in the temporary speed holding unit 59. In response to the instruction from the variation rate adjusting unit 56A, the state variation control unit 53A changes the scroll speed time-varying rate. In this manner, the state variation control unit 53A suspends the inertial scrolling and performs scrolling so that the scroll speed v will converge on the convergence speed.

At step S21, the state variation control unit 53A judges whether or not the current scroll speed v is higher than the convergence speed v2 stored in the temporary speed holding unit 59. If judging that the current scroll speed v is higher than the convergence speed v2 (S21: yes), at step S22 the state variation control unit 53A decreases the scroll speed v.

At step S23, the contact manipulation judging unit 30 judges whether or not the finger FG that has been in the hover manipulation state has made a touch manipulation. If judging that the finger FG that has been in the hover manipulation state has made a touch manipulation (S23: yes), the contact manipulation judging unit 30 informs the application 50A that the finger FG that has been in the hover manipulation state has made a touch manipulation. In response to the notice sent from the contact manipulation judging unit 30, at step S24 the state variation control unit 53A stops the scrolling by setting the scroll speed v to zero immediately or smoothly. If the finger FG that has been in the hover manipulation state does not make a touch manipulation (S23: no), the process of the portable terminal 200 returns to step S12, that is, the scrolling is continued.

On the other hand, if the state variation control unit 53A judges that the scroll speed v is equal to the convergence speed v2 (S21: no), at step S12 the scrolling is performed in such a manner that the scroll speed v is kept equal to the convergence speed v2 as long as the hover manipulation (e.g., hover hold manipulation) of the finger FG is detected.

If hovering-out of the finger FG is detected (S13: no) and the variation rate adjusting unit 56A judges that the scroll speed v of inertial scrolling is higher than zero (S16: yes), at step S14A scrolling is performed at the scroll speed that was set at step S15.

In the above-described process, in the portable terminal 200 according to the embodiment, after inertial scrolling was started by a touch flick manipulation of a finger FG, while a hover manipulation of the finger FG continues to be detected, the inertial scrolling is suspended and the scroll speed v is decreased gradually until reaching the convergence speed v2, and, after that, scrolling is performed at the constant, convergence speed v2.

As a result, in the portable terminal 200 according to the embodiment, even if a scroll speed of inertial scrolling at the time of detection of hovering-in of a finger FG is not preferable to the user, while the hover manipulation of the finger FG continues to be detected, the scroll speed v is decreased to the convergence speed v2 gradually and then scrolling is performed at the constant, convergence speed v2. Therefore, for example, scrolling can be performed at a proper scroll speed when the user wants to view a content in a flowing state.

Embodiment 3

A portable terminal 300 according to a third embodiment operates in the same manner as the portable terminal 300 according to the second embodiment and, in addition, starts automatic scrolling (described later) if detecting that a hover manipulation of a finger FG has continued for more than or equal to a given (e.g., prescribed) time. During the automatic scrolling, as in the second embodiment, the portable terminal 300 decreases the scroll speed gradually to a convergence speed and, after that, keeps the scroll speed at the constant, convergence speed.

Functional Configuration of Portable Terminal 300 According to Embodiment 3

Figure 8:
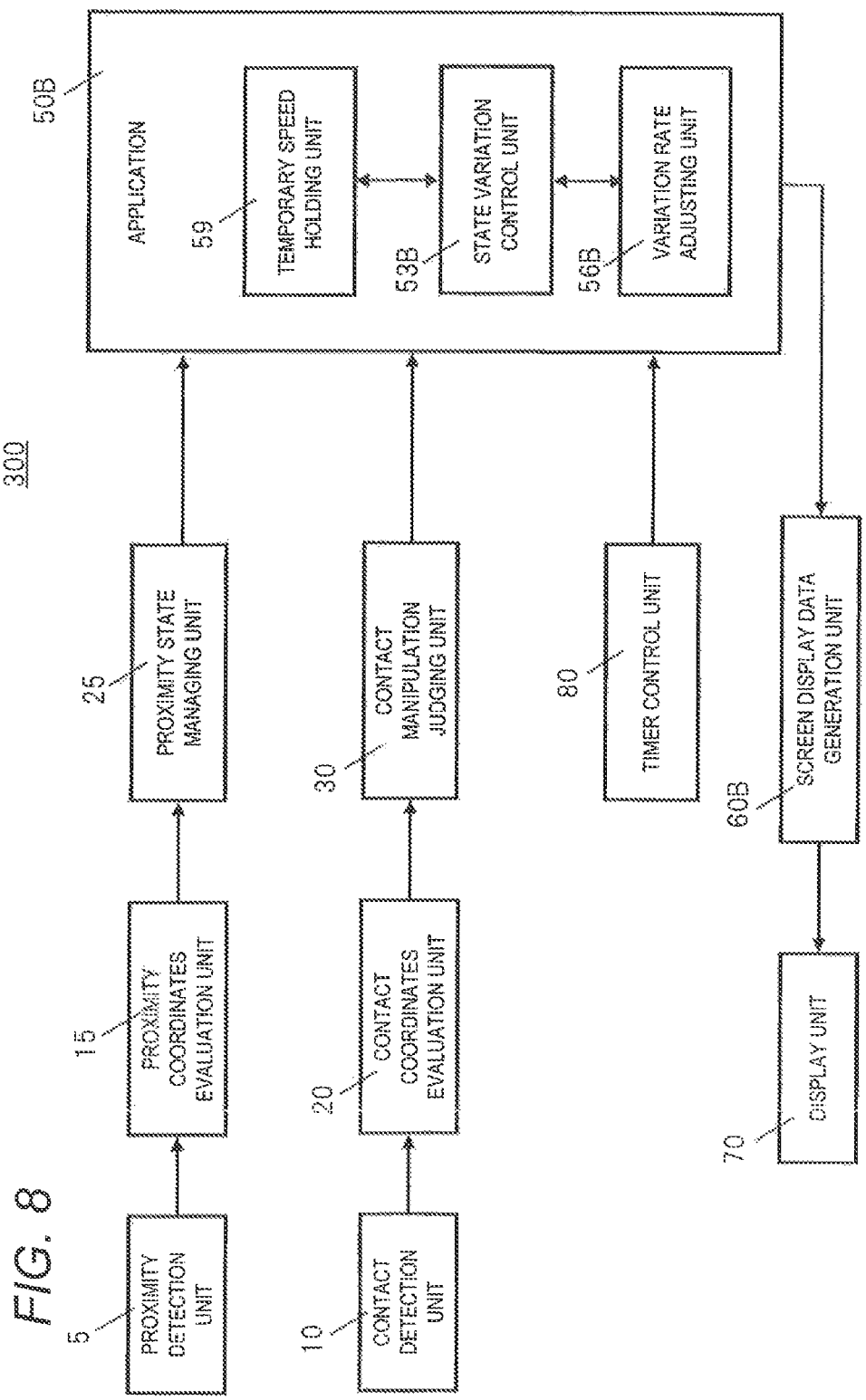
FIG. 8 is a block diagram showing the functional configuration of a portable terminal according to a third embodiment.

The functional configuration of the portable terminal 300 according to the third embodiment will be described with reference to FIG. 8. FIG. 8 is a block diagram showing the functional configuration of the portable terminal 300 according to the third embodiment. The portable terminal 300 shown in FIG. 8 includes a proximity detection unit 5, a contact detection unit 10, a proximity coordinates evaluation unit 15, a contact coordinates evaluation unit 20, a proximity state managing unit 25, a contact manipulation judging unit 30, an application 50B, a display screen data generation unit 60B, a display unit 70, and a timer control unit 80. The application SOB as a scrolling control unit includes a state variation control unit 53B, a variation rate adjusting unit 56B, and a temporary speed holding unit 59. In the description of the individual units of the portable terminal 300 shown in FIG. 8, units having the same ones in the portable terminal 200 shown in FIG. 5 will be given the same reference symbols as the latter and descriptions therefor will be simplified or omitted. That is, only different units will be described in detail.

The timer control unit 80, which has a function of measuring time that elapses in the portable terminal 300, outputs measured time information to the application 50B.

After hovering-in of a finger FG was detected by the proximity state managing unit 25 after a touch flick manipulation of the finger FG, the state variation control unit 53B judges whether or not a hover manipulation of the finger FG has continued for more than or equal to a prescribed time on the basis of the time information that is output from the timer control unit 80. The prescribed time may either be a fixed value that is prescribed as part of the operation particulars of the state variation control unit 53B or be changed as appropriate.

If judging that a hover manipulation of the finger FG has continued for more than or equal to the prescribed time, the state variation control unit 53B suspends the inertial scrolling and starts automatic scrolling. The automatic scrolling is an operation of performing scrolling in such a manner as to decrease the scroll speed v to a convergence speed v2 automatically irrespective of whether a finger FG is in a proximity state and, after that, keep the scroll speed v at the convergence speed v2. The state variation control unit 53B stops automatic scrolling as soon as the contact manipulation judging unit 30 detects a touch manipulation of the finger FG.

While the state variation control unit 53B is performing automatic scrolling, the display screen data generation unit 60B as a display control unit displays, on the screen of the display unit 70, an indication (e.g., mark) indicating that automatic scrolling is being performed. When automatic scrolling is finished, the display screen data generation unit 60B erases the indication from the screen of the display unit 70. With this measure, the display screen data generation unit 60B allows the user to recognize a state that automatic scrolling is being performed.

Operation of Portable Terminal 300 According to Embodiment 3

Figure 9:
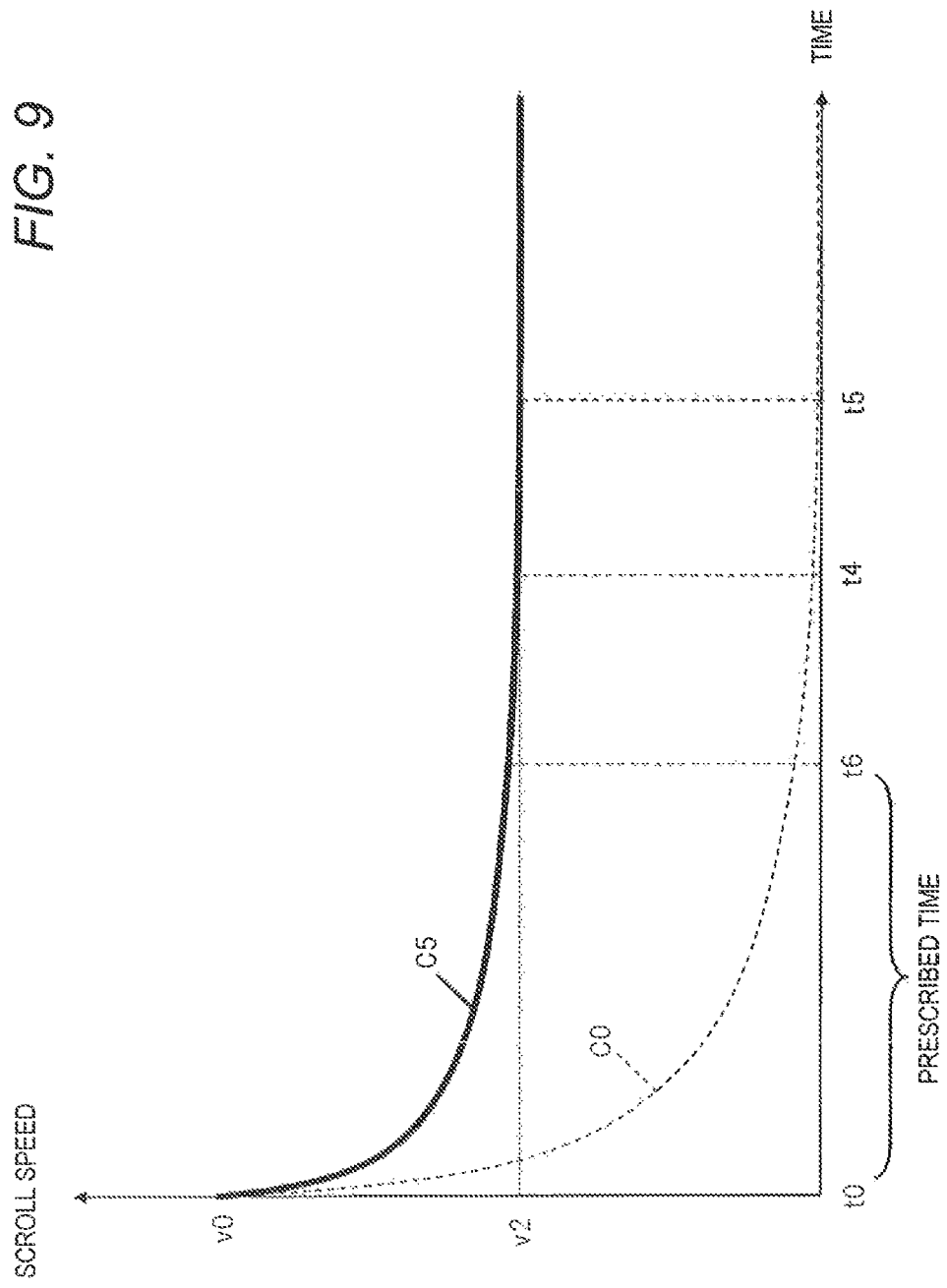
FIG. 9 is a graph showing how the scroll speed is varied with time in the third embodiment.
Figure 10:
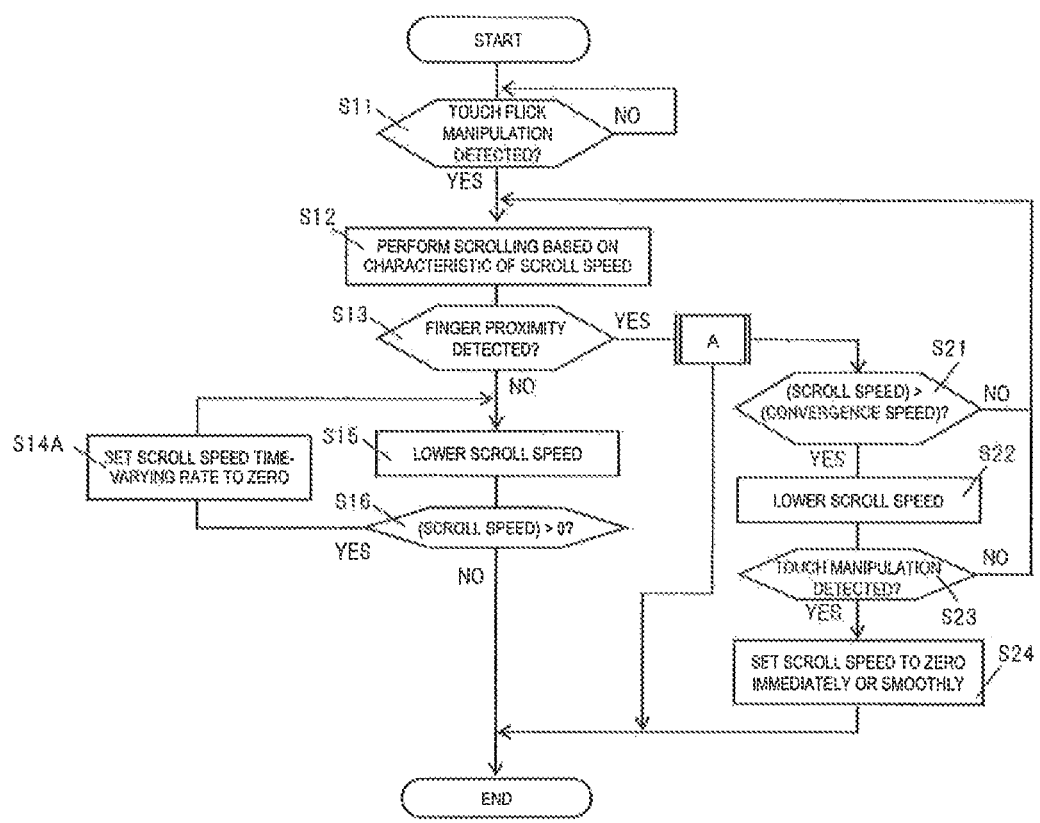
FIG. 10 is a flowchart showing how the portable terminal according to the third embodiment operates.
Figure 11:
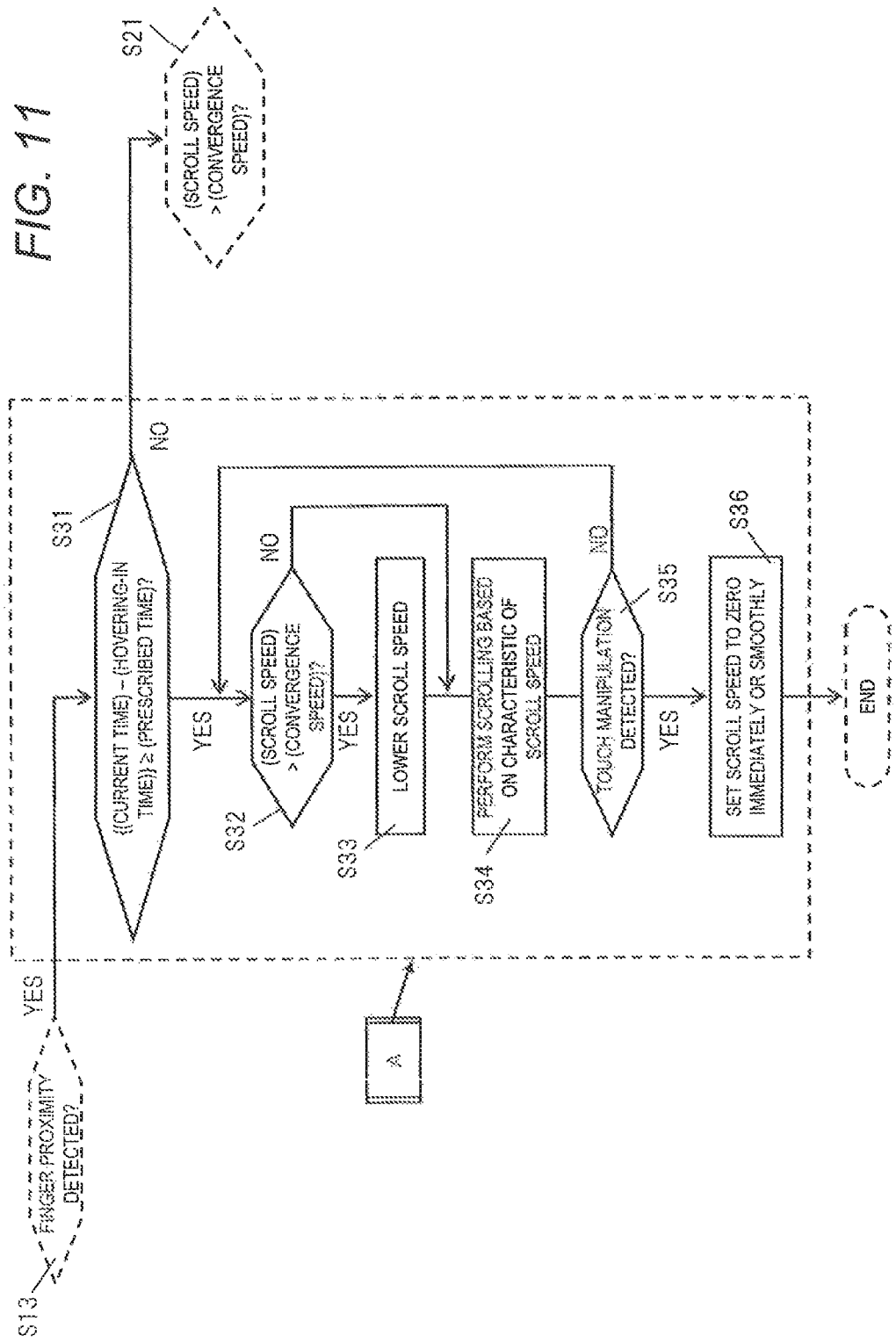
FIG. 11 is a flowchart showing the details of a process A of the portable terminal according to the third embodiment.

Next, how the portable terminal 300 according to this embodiment operates will be described with reference to FIGS. 9-11. FIG. 9 is a graph showing how the scroll speed is varied with time in the third embodiment. FIG. 10 is a flowchart showing how the portable terminal 300 according to the third embodiment operates. FIG. 11 is a flowchart showing the details of a process A of the portable terminal 300 according to the third embodiment.

In FIG. 9, time t0 is a time when a touch flick manipulation and hovering-in are detected simultaneously, time t4 is a time when the scroll speed v becomes equal to a convergence speed v2, time t5 is a time when hovering-out is detected, and time t6 is a time when a prescribed time has elapsed from time t0 when the touch flick manipulation and the hovering-in were performed. Since the scroll curve C0 is the same as shown in FIG. 3 and hence will not be described.

In the description of the flowchart of FIG. 10, steps having the same ones in the flowchart of FIG. 7 will be given the same reference symbols as the latter and descriptions therefor will be simplified or omitted. Only different steps will be described in detail.

In a scroll curve C5, at time t0, a touch flick manipulation and hovering-in are detected simultaneously and hence inertial scrolling is not performed. From time t0, as in the second embodiment, the scroll speed v is decreased gradually from an initial scroll speed v0 so as to converge on the convergence speed v2. The scroll speed v becomes equal to the convergence speed v2 at time t4. Automatic scrolling is started at time t6 when the prescribed time has elapsed from time t0. Therefore, even if hovering-out of the finger FG is detected at time t5, unlike in the second embodiment, inertial scrolling is not started and the scroll speed v is kept at the convergence speed v2.

In the scroll curve C5, a touch flick manipulation and hovering-in are detected simultaneously at time t0. Where hovering-in is detected some time after time t0, time measurement for starting automatic scrolling is started at the time point of the detection of the hovering-in.

The process of the portable terminal 300 according to the third embodiment shown in FIG. 10 is the same as the process of the portable terminal 200 according to the second embodiment shown in FIG. 7 except that the process A is added between steps S13 and S21. Therefore, only different steps, that is, the process A, will be described below.

Referring to FIG. 11, if detecting that the finger FG has hovered in after a touch flick manipulation (S13: yes), the proximity state managing, unit 25 informs the application 50B that the finger FG has hovered in. At step S31, the state variation control unit 53B judges whether or not the finger FG has continued the hover manipulation far more than or equal to a prescribed time from the time of the detection of the hovering-in on the basis of time information that is output from the timer control unit 80. If judging that the finger FG has not yet continued the hover manipulation for more than or equal to the prescribed time from the time of the detection of the hovering-in (S31: no), the process of the portable terminal 300 moves to step S21.

If judging that the finger FG has continued the hover manipulation for more than or equal to the prescribed time from the time of the detection of the hovering-in (S31: yes), the state variation control unit 53B suspends inertial scrolling and starts automatic scrolling. At step S32, the state variation control unit 53B judges whether or not the current scroll speed v is higher than a convergence speed v2 stored in the temporary speed holding unit 59. If judging that the current scroll speed v is higher than the convergence speed v2 (S32: yes), at step S33 the state variation control unit 53B decreases the scroll speed v. At step S34, the state variation control unit 53B performs scrolling at the scroll speed that was set at step S33. On the other hand, if judging that the scroll speed v is not higher than the convergence speed v2, that is, equal to the convergence speed v2 (S32: no), at step S34 the state variation control unit 53B performs scrolling without decreasing the scroll speed v.

At step S35, the contact manipulation judging unit 30 judges whether or not the finger FG that has been in the hover manipulation state (e.g., hover hold manipulation state) has made a touch manipulation. If judging that the finger FG that has been in the hover manipulation state has made a touch manipulation (S35: yes), the contact manipulation judging unit 30 informs the application 50B that the finger FG that has been in the hover manipulation state has made a touch manipulation. In response to the notice sent from the contact manipulation judging unit 30, at step S36 the state variation control unit 53B stops the automatic scrolling by setting the scroll speed v to zero immediately or smoothly. If the finger FG that has been in the hover manipulation state does not make a touch manipulation (S35: no), the process of the portable terminal 300 returns to step S32, that is, the automatic scrolling is continued.

In the above-described process, the portable terminal 300 according to the embodiment suspends inertial scrolling and starts automatic scrolling if detecting that a hover manipulation of a finger FG has continued for more than or equal to the prescribed time. During the automatic scrolling, as in the second embodiment, the portable terminal 300 decreases the scroll speed v gradually to the convergence speed v2 and, after that, keeps the scroll speed v at the constant, convergence speed v2 irrespective of whether hovering-in or hovering-out occurs.

In the portable terminal 300 according to the embodiment, since inertial scrolling is suspended and automatic scrolling is started easily by the user by continuing a hover manipulation for more than or equal to the prescribed time. During the automatic scrolling, the scroll speed v is decreased gradually to the convergence speed v2 or kept at the convergence speed v2 even if the finger FG hovers out. Thus, automatic scrolling in which the scroll speed v is decreased gradually so as to converge on the convergence speed v2 can be performed without a finger FG's suffering an unduly heavy load.

Embodiment 4

A portable terminal 300 according to a fourth embodiment operates in the same manner as the portable terminal 300 according to the third embodiment except for the following. If a hover manipulation (e.g., hover hold manipulation) of a finger is detected in a state that the finger is not close to the surface of the touch panel TP and automatic scrolling is being performed, the portable terminal 300 suspends the automatic scrolling and decreases the scroll speed to zero or a constant speed that is lower than the current scroll speed. If hovering-out of the finger is then detected, the portable terminal 300 restarts automatic scrolling.

Functional Configuration of Portable Terminal 300 According to Embodiment 4

The functional configuration of the portable terminal 300 according to the fourth embodiment is similar to that of the portable terminal 300 according to the third embodiment shown in FIG. 8. Therefore, descriptions of units having the same ones in the portable terminal 300 shown in FIG. 8 will be simplified or omitted. That is, only different units will be described in detail.

During automatic scrolling, the state variation control unit 53B judges whether or not hovering-in of a finger FG has been detected in a non-proximity state by the proximity state managing unit 25. If judging that hovering-in of a finger FG has been detected in a non-proximity state by the proximity state managing unit 25, the state variation control unit 53B stores a scroll speed at the time of the detection of the hovering-in in the temporary speed holding unit 59.

In that event, the variation rate adjusting unit 56B instructs the state variation control unit 53B to suspend the automatic scrolling. In response to the instruction from the variation rate adjusting unit 56B, the state variation control unit 53B suspends the automatic scrolling and decreases the scroll speed to zero. Instead of decreasing the scroll speed to zero, the state variation control unit 53B may decrease the scroll speed to a constant speed that is lower than the current scroll speed. In the following description, it is assumed that the scroll speed reduction during suspension of automatic scrolling includes reduction to a constant speed that is lower than the current scroll speed.

During the suspension of the automatic scrolling, the state variation control unit 53B judges whether or not hovering-out of the finger FG that has been in the hover manipulation state has been detected by the proximity state managing unit 25. If judging that hovering-out of the finger FG that has been in the hover manipulation state has been detected by the proximity state managing unit 25, the state variation control unit 53B changes the scroll speed from the current value (=0) to the value stored in the temporary speed holding unit 59.

In that event, the variation rate adjusting unit 56B instructs the state variation control unit 53B to restart automatic scrolling. In response to the instruction from the variation rate adjusting unit 56B, the state variation control unit 53B restarts automatic scrolling according to the scroll speed stared in the temporary speed holding unit 59.

Operation of Portable Terminal 300 According to Embodiment 4

Figure 12:
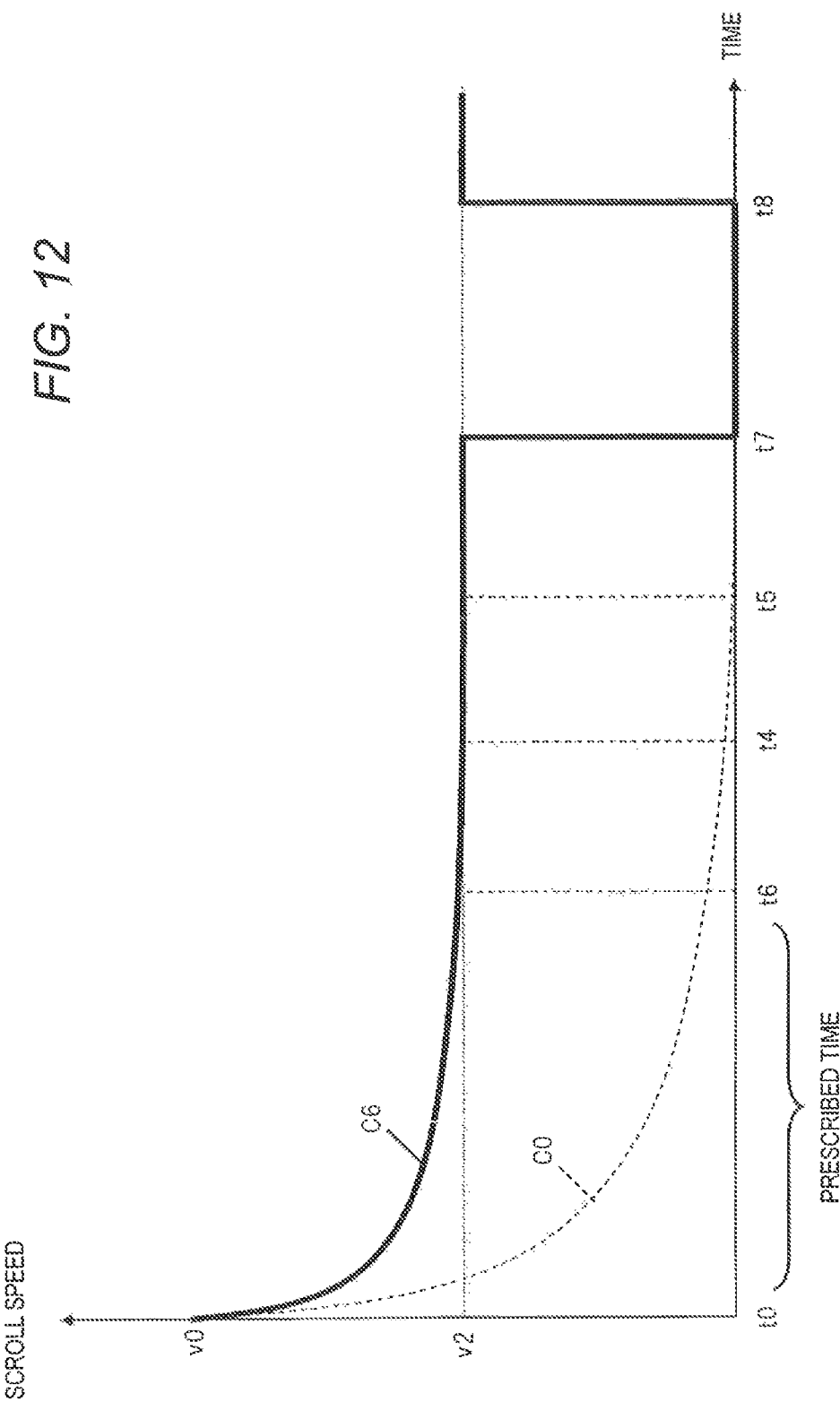
FIG. 12 is a graph showing how the scroll speed is varied with time in a fourth embodiment.
Figure 13:
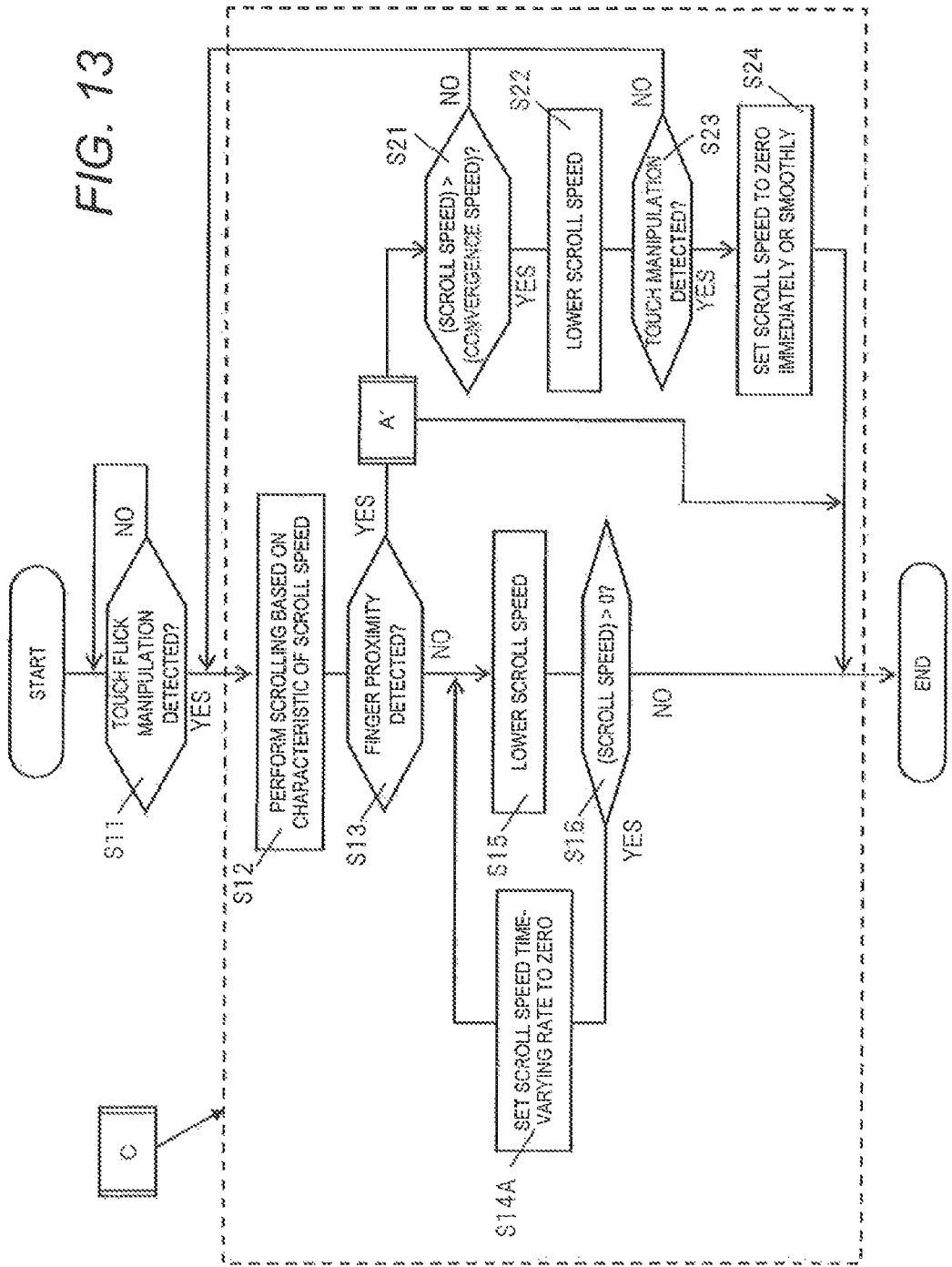
FIG. 13 is a flowchart showing how a portable terminal according to the fourth embodiment operates.
Figure 14:
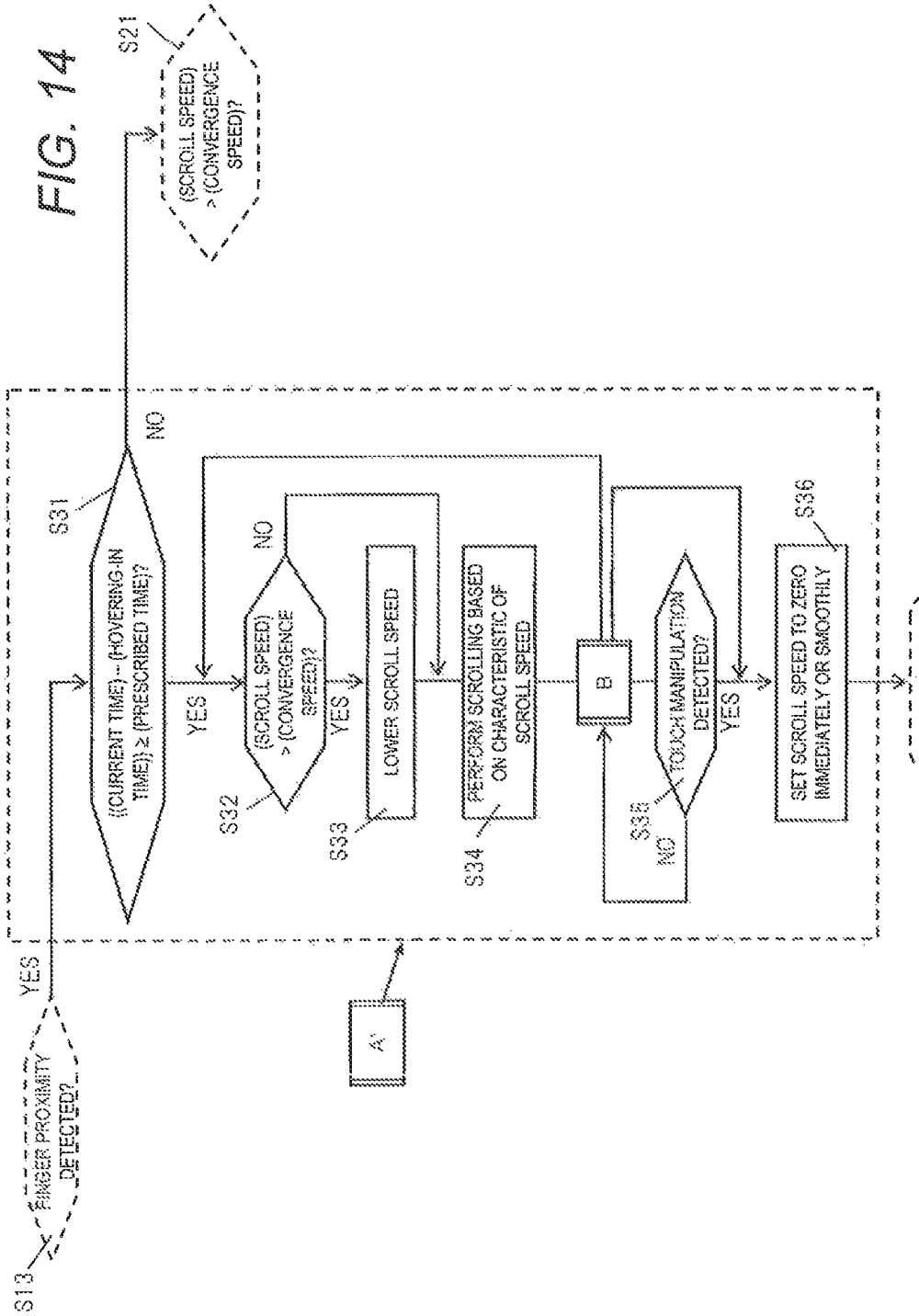
FIG. 14 is a flowchart showing the details of a process A' of the portable terminal according to the fourth embodiment.
Figure 15:
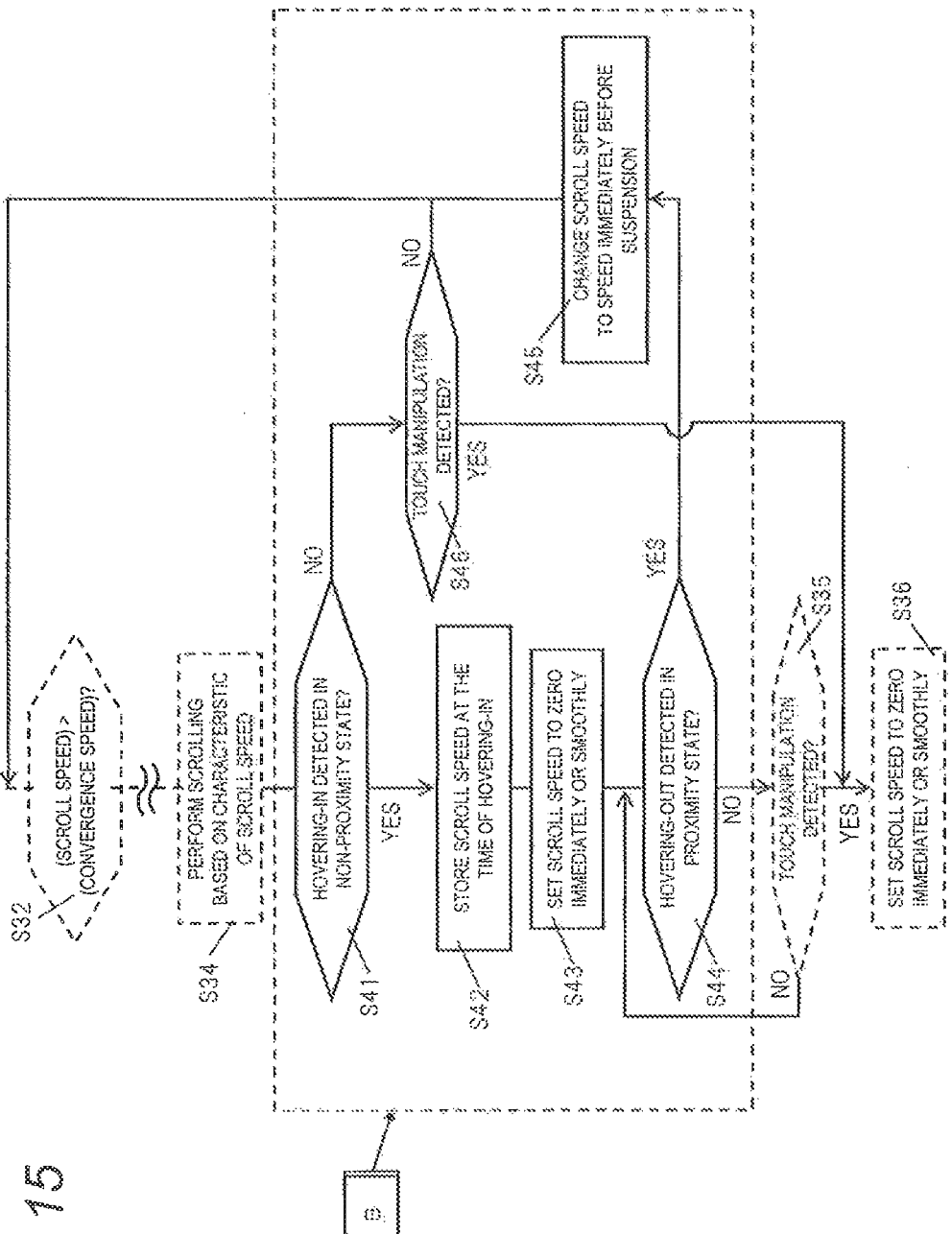
FIG. 15 is a flowchart showing the details of a process B of the portable terminal according to the fourth embodiment.

Next, how the portable terminal 300 according to this embodiment operates will be described with reference to FIGS. 12-15. FIG. 12 is a graph showing how the scroll speed is varied with time in the fourth embodiment. FIG. 13 is a flowchart showing how the portable terminal 300 according to the fourth embodiment operates. FIG. 14 is a flowchart showing the details of a process A' of the portable terminal 300 according to the fourth embodiment. FIG. 15 is a flowchart showing the details of a process B of the portable terminal 300 according to the fourth embodiment.

In FIG. 12, time t0 is a time when a touch flick manipulation and hovering-in are detected simultaneously, time t4 is a time when the scroll speed v becomes equal to a convergence speed v2, time t5 is a time when hovering-out is detected, time t6 is a time when a prescribed time has elapsed from time t0 when the touch flick manipulation and the hovering-in were performed, time t7 is a time when hovering-in is detected in the non-proximity state, and time t8 is a time when hovering-out is detected in the state that the hover manipulation is performed. Since the scroll curve C0 is the same as shown in FIG. 3 and hence will not be described.

In the description of the flowcharts of FIGS. 13 and 14, steps having the same ones in the flowchart of FIGS. 10 and 11 will be given the same reference symbols as the latter and descriptions therefor will be simplified or omitted. Only different steps will be described in detail.

In a scroll curve C6, at time t0, a touch flick manipulation and hovering-in are detected simultaneously and hence inertial scrolling is not performed. From time t0, as in the second embodiment, the scroll speed v is decreased gradually from an initial scroll speed v0 so as to converge on the convergence speed v2. The scroll speed v becomes equal to the convergence speed v2 at time t4. Automatic scrolling is started at time t6 when the prescribed time has elapsed from time t0. Therefore, even if hovering-out of the finger FG is detected at time t5, unlike in the second embodiment, inertial scrolling is not restarted and the scroll speed v is kept at the convergence speed v2.

Furthermore, in the scroll curve C6, when hovering-in is detected in the non-proximity state at time t7, the automatic scrolling is suspended and the scroll speed v is decreased to zero. When hovering-out is detected at time t8 in the state that the hover manipulation is performed, automatic scrolling is restarted in which the scroll speed will be kept at the speed immediately before time t7.

In the scroll curve C6, a touch flick manipulation and hovering-in are detected simultaneously at time t0. Where hovering-in of the finger FG is detected some time after time t0, time measurement for starting automatic scrolling is started at the time point of the detection of the hovering-in.

The process of the portable terminal 300 according to the fourth embodiment shown in FIGS. 13 and 14 is the same as the process of the portable terminal 300 according to the third embodiment shown in FIGS. 10 and 11 except that the process is added between steps S34 and S35. Therefore, only different steps, that is, the process B, will be described below.

Referring to FIG. 15, while the automatic scrolling is being performed (S34), at step S41 the state variation control unit 53B judges whether or not hovering-in of the finger FG has been detected in a non-proximity state by the proximity state managing unit 25. If judging that hovering-in of the finger FG has been detected in a non-proximity state by the proximity state managing unit 25 (S41: yes), at step S42 the state variation control unit 53B stores a scroll speed of the automatic scrolling at the time of the detection of the hovering-in in the temporary speed holding unit 59.

The variation rate adjusting unit 56B instructs the state variation control unit 53B to suspend the automatic scrolling. In response to the instruction from the variation rate adjusting unit 56B, at step S43 the state variation control unit 53B suspends the automatic scrolling by setting the scroll speed v to zero immediately or smoothly.

At step S44, the state variation control unit 53B judges whether or not hovering-out of the finger FG has been detected by the proximity state managing unit 25 in the proximity state during the suspension of the automatic scrolling. If hovering-out of the finger FG is not detected by the proximity state managing unit 25 in the proximity state during the suspension of the automatic scrolling (S44: no), the process of the portable terminal 300 moves to step S35. Step S44 is executed repeatedly until a touch manipulation is detected at step S35.

If judging that hovering-out of the finger FG has been detected by the proximity state managing unit 25 in the proximity state during the suspension of the automatic scrolling (S44: yes), at step S45 the state variation control unit 53B changes the scroll speed v from the current value (zero) to the value stored in the temporary speed holding unit 59.

The variation rate adjusting unit 56B instructs the state variation control unit 53B to restart automatic scrolling. In response to the instruction from the variation rate adjusting unit 56B, the state variation control unit 53B restarts automatic scrolling at the scroll speed stored in the temporary speed holding unit 59. After the execution of step S45, the process of the portable terminal 300 according to the embodiment returns to step S32.

On the other hand, if judging that hovering-in of the finger FG is not detected in a non-proximity state during the automatic scrolling (S41: no), the state variation control unit 53B continues the automatic scrolling. At step S46, the contact manipulation judging unit 30 judges whether or not a touch manipulation has been performed by the finger FG.

If judging that a touch manipulation has been performed by the finger FG (S46: yes), the contact manipulation judging unit 30 communications a notice to that effect to the application 50B. The process of the portable terminal 300 according to the embodiment then moves to step S36. If no touch manipulation is detected (S46: no), the process of the portable terminal 300 according to the embodiment returns to step S32 and the automatic scrolling is continued.

In the above-described process, if detecting hovering-in of a finger FG in a non-proximity state during automatic scrolling, the portable terminal 300 according to the embodiment stores a scroll speed of the automatic scrolling at the time of the detection of the hovering-in in the temporary speed holding unit 59 and suspends the automatic scrolling. If detecting hovering-out of the finger FG in the proximity state during the suspension of the automatic scrolling, the portable terminal 300 restarts automatic scrolling at the scroll speed stored in the temporary speed holding unit 59.

In the automatic scrolling, the scroll speed v is kept at the convergence speed v2 if the scroll speed that is employed when automatic scrolling is restarted is equal to the convergence speed v2. If the scroll speed that is employed when automatic scrolling is restarted is higher than the convergence speed v2, the scroll speed v is decreased gradually so as to converge on the convergence speed v2.

With the above measure, in the portable terminal 300 according to the embodiment, if a content that attracts attention of the user starts to be displayed during automatic scrolling, the user can easily suspend the automatic scrolling by making a hover hold manipulation with his or her finger FG. Furthermore, when the user has completed viewing of the content that attracted attention of the user, the user can easily restart automatic scrolling by hovering out the finger FG (i.e., finishing the hover hold manipulation). Thus, flexible scrolling can be performed so as to match an intention of the user.

Embodiment 5

In the third and fourth embodiments, the portable terminal 300 or 300 starts automatic scrolling if it is detected that a hover manipulation has continued for more than or equal to the prescribed time from hovering-in after a touch flick manipulation was detected. In contrast, a portable terminal 300 according to a fifth embodiment starts automatic scrolling upon detection of a touch flick manipulation, rather than a hover manipulation having lasted the prescribed time, of a finger FG is detected.

Functional Configuration of Portable Terminal 300 According to Embodiment 5

The functional configuration of the portable terminal 300 according to the fifth embodiment is similar to that of the portable terminal 300 according to the third embodiment shown in FIG. 8. Therefore, descriptions of units having the same ones in the portable terminal 300 according to the third embodiment or the portable terminal 300 according to the fourth embodiment will be simplified or omitted. That is, only different units will be described in detail.

The state variation control unit 53B judges whether or not a touch flick manipulation of a finger FG has been detected by the contact manipulation judging unit 30. If judging that a touch flick manipulation of a finger FG has been detected the contact manipulation judging unit 30, the state variation control unit 53B suspends inertial scrolling and starts automatic scrolling.

Operation of Portable Terminal 300 According to Embodiment 5

Figure 16:
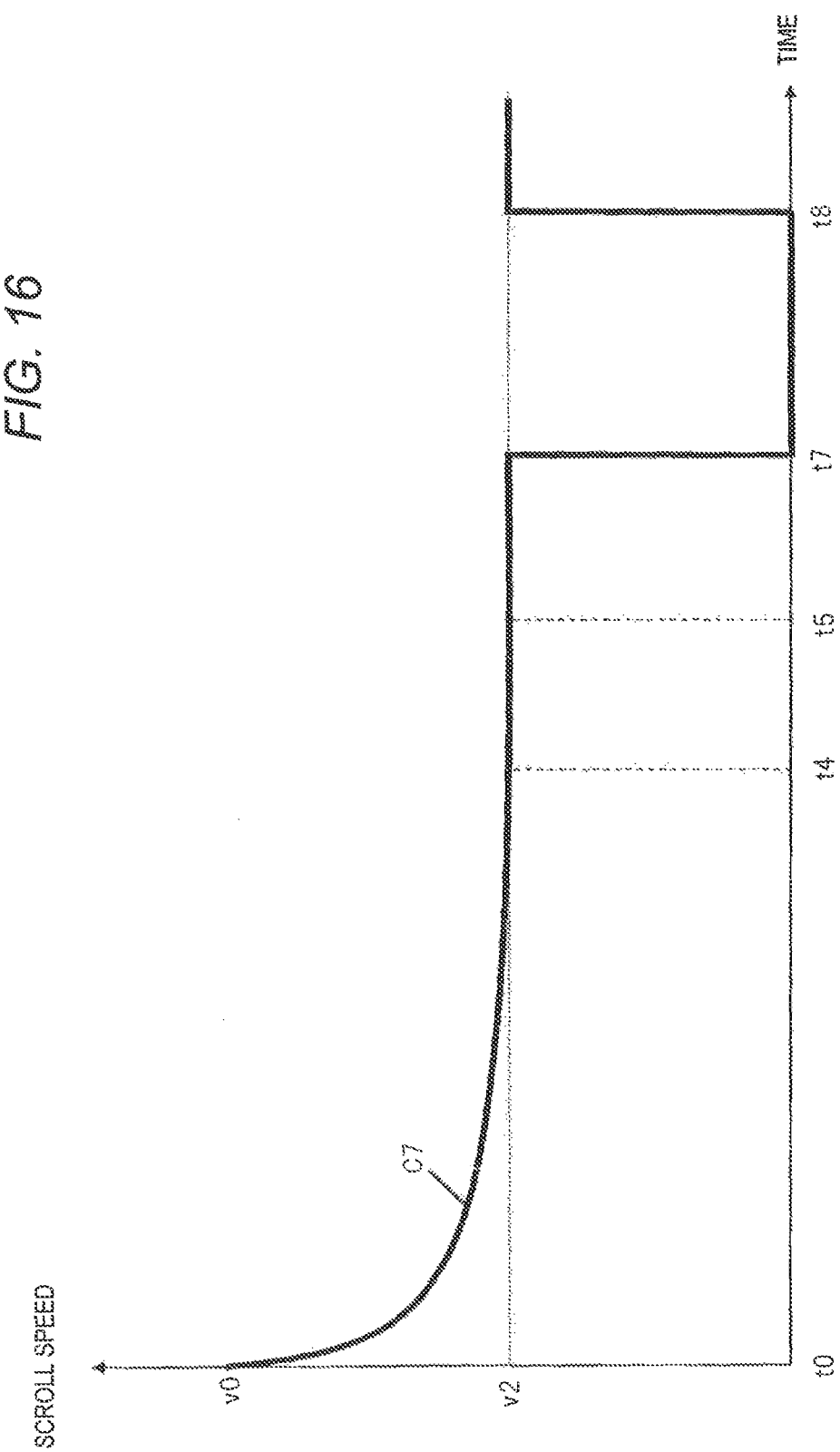
FIG. 16 is a graph showing how the scroll speed is varied with time in a fifth embodiment.
Figure 17:
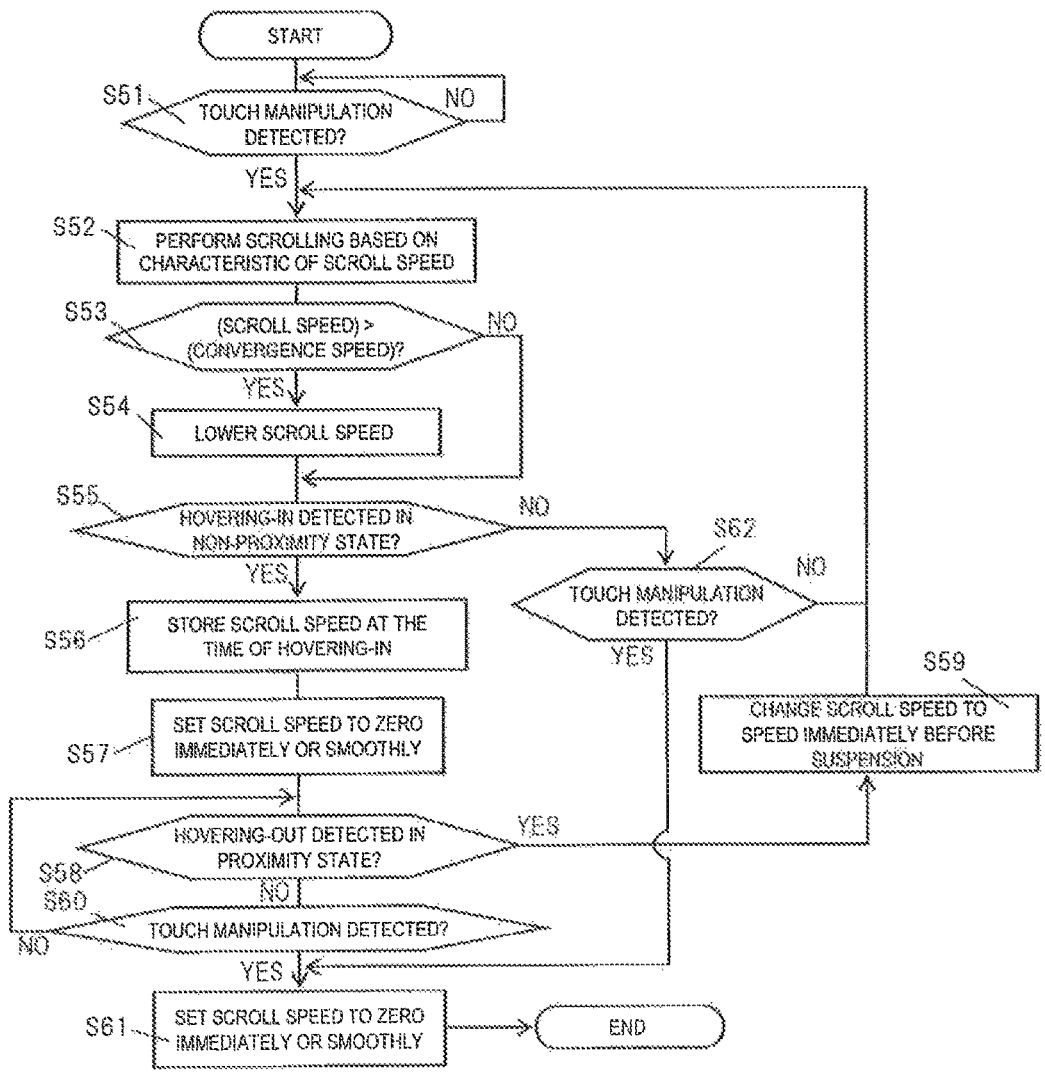
FIG. 17 is a flowchart showing how a portable terminal according to the fifth embodiment operates.

Next, now the portable terminal 300 according to this embodiment operates will be described with reference to FIGS. 16 and 17. FIG. 16 is a graph showing how the scroll speed is varied with time in the fifth embodiment. FIG. 17 is a flowchart showing how the portable terminal 300 according to the fifth embodiment operates.

In FIG. 16, time t0 is a time when a touch flick manipulation is detected, time t4 is a time when the scroll speed v becomes equal to a convergence speed v2, time t5 is a time when hovering-out is detected, time t7 is a time when hovering-in is detected in the non-proximity state, and time t8 is a time when hovering-out is detected in the state that the hover manipulation is performed.

In a scroll curve C7, at time t0, a touch flick manipulation is detected and hence inertial scrolling is not started. After time t0, as in the second embodiment, the scroll speed v is decreased gradually from an initial scroll speed v0 so as to converge on a convergence speed v2. At time t4, the scroll speed v becomes equal to the convergence speed v2. In this embodiment, since automatic scrolling is started at time t0, unlike in the second embodiment, even if hovering-out of the finger FG is detected at time t5, inertial scrolling is not started and the scroll speed v is kept at the convergence speed v2.

Furthermore, in the scroll curve C7, when hovering-in is detected in the non-proximity state at time t7, the automatic scrolling is suspended and the scroll speed v is decreased to zero. When hovering-out is detected at time t8 in the state that the hover manipulation is performed, automatic scrolling is restarted in which the scroll speed will be kept at the speed of the automatic scrolling immediately before time t7.

Referring to FIG. 17, at step S51, the state variation control unit 53B judges whether or not a touch flick manipulation of a finger FG has been detected by the contact manipulation judging unit 30. If judging that a touch flick manipulation of a finger FG has been detected by the contact manipulation judging unit 30 (S51: yes), at step S52 the state variation control unit 53B starts automatic scrolling. An initial speed of the automatic scrolling is calculated by the state variation control unit 53B according to a movement speed at which the finger FG has been flicked on the surface of the touch panel TP in making the touch flick manipulation.

At step S53, the state variation control unit 53B judges whether or not the current scroll speed v of the automatic scrolling is higher than a convergence speed v2 that is stored in the temporary speed holding unit 59. If judging that the current scroll speed v of the automatic scrolling is higher than the convergence speed v2 (S53: yes), at step S54 the state variation control unit 53B decreases the scroll speed v gradually so that it converges on the convergence speed v2. If judging that the current scroll speed v of the automatic scrolling is not higher than the convergence speed v2 (S53: no), the process of the portable terminal 300 according to the embodiment moves to step S55.

At step S55, the state variation control unit 53B judges whether or not hovering-in of the finger FG has been detected in a non-proximity state by the proximity state managing unit 25. If judging that hovering-in of the finger FG has been detected in a non-proximity state by the proximity state managing unit 25 (S55: yes), at step S56 the state variation control unit 53B stores a scroll speed of the automatic scrolling at the time of the detection of the hovering-in in the temporary speed holding unit 59.

The variation rate adjusting unit 56B instructs the state variation control unit 53B to suspend the automatic scrolling. In response to the instruction from the variation rate adjusting unit 56B, at step S57 the state variation control unit 53B suspends the automatic scrolling by setting the scroll speed v to zero immediately or smoothly.

At step S58, the state variation control unit 53B judges whether or not hovering-out of the finger FG has been detected by the proximity state managing unit 25 in the proximity state during the suspension of the automatic scrolling. If judging that hovering-out of the finger FG has been detected by the proximity state managing unit 25 in the proximity state during the suspension of the automatic scrolling (S58: yes), at step S59 the state variation control unit 53B changes the scroll speed v from the current value (zero) to the value stored in the temporary speed holding unit 59. After the execution of step S59, the process of the portable terminal 300 according to the embodiment returns to step S52.

If judging that hovering-out of the finger FG is not detected in the proximity state during the suspension of the automatic scrolling (S58: no), the state variation control unit 53B continues the automatic scrolling. At step S60, the state variation control unit 53B judges whether or not the finger FG that has been in the hover manipulation state has made a touch manipulation. If judging that the finger FG that has been in the hover manipulation state has made a touch manipulation (S60: yes), the contact manipulation judging unit 30 informs the application 50B that the finger PG that has been in the hover manipulation state has made a touch manipulation. In response to the notice sent from the contact manipulation judging unit 30, at step S61 the state variation control unit 53B stops the automatic scrolling by setting the scroll speed v to zero immediately or smoothly. If the finger FG that has been in the hover manipulation state does not make a touch manipulation (S60: no), the process of the portable terminal 300 returns to step S58.

On the other hand, if judging that hovering-in of the finger FG is not detected in a non-proximity state during the automatic scrolling (S55: no), the state variation control unit 53B continues the automatic scrolling. At step S62, the contact manipulation judging unit 30 judges whether or not a touch manipulation has been performed by the finger FG.

If judging that a touch manipulation has been performed by the finger FG (S62: yes), the contact manipulation judging unit 30 communications a notice to that effect to the application 50B. The process of the portable terminal 300 according to the embodiment then moves to step S61. If no touch manipulation is detected (S62: no), the process of the portable terminal 300 according to the embodiment returns to step S52 and the automatic scrolling is continued.

In the above-described process, the portable terminal 300 according to the embodiment starts automatic scrolling upon detection of a touch flick manipulation. If detecting hovering-in of a finger FG in a non-proximity state during automatic scrolling, the portable terminal 300 according to the embodiment stores a scroll speed of the automatic scrolling at the time of the detection of the hovering-in in the temporary speed holding unit 59 and suspends the automatic scrolling. If detecting hovering-out of the finger FG in the proximity state during the suspension of the automatic scrolling, the portable terminal 300 restarts automatic scrolling at the scroll speed stored in the temporary speed holding unit 59.

In the automatic scrolling, the scroll speed v is kept at the convergence speed v2 if the scroll speed that is employed when automatic scrolling is restarted is equal to the convergence speed v2. If the scroll speed that is employed when automatic scrolling is restarted is higher than the convergence speed v2, the scroll speed v is decreased gradually so as to converge on the convergence speed v2.

With the above measure, in the portable terminal 300 according to the embodiment, the user can easily restart automatic scrolling by making, for example, a touch flick manipulation with a finger FG instead of continuing a hover manipulation (e.g., hover hold manipulation) for more than or equal to a prescribed time. Thus, the manipulation to be performed by the user to start automatic scrolling can be simplified.

Embodiment 6

A portable terminal 300 according to a sixth embodiment switches the scroll speed control method according to an initial scroll speed of inertial scrolling at the time of a touch flick manipulation of a finger.

Functional Configuration of Portable Terminal 300 According to Embodiment 6

The functional configuration of the portable terminal 300 according to the sixth embodiment is similar to that of the portable terminal 300 according to the third embodiment shown in FIG. 8. Therefore, descriptions of units having the same ones in the portable terminal 300 according to the third embodiment or the portable terminal 300 according to the fourth embodiment will be simplified or omitted. That is, only different units will be described in detail.

The state variation control unit 53B judges whether or not a touch flick manipulation of a finger FG has been detected by the contact manipulation judging unit 30. If judging that a touch flick manipulation of a finger FG has been detected by the contact manipulation judging unit 30, the state variation control unit 53B starts inertial scrolling and, furthermore, compares an initial scroll speed of the inertial scrolling with a prescribed first threshold speed and a prescribed second threshold speed, which are fixed values prescribed in advance as part of the operation particulars of the state variation control unit 53B. The first threshold speed is higher than the second threshold speed.

If judging that the initial scroll speed of the inertial scrolling is higher than or equal to the first threshold speed, as in the second embodiment, while a hover manipulation of a finger is detected, the state variation control unit 53B suspends the inertial scrolling and decreases the scroll speed v gradually to a convergence speed v2 and, after that, keeps the scroll speed at the constant, convergence speed v2.

If judging that the initial scroll speed of the inertial scrolling is higher than or equal to the second threshold speed and lower than the first threshold speed, as in the fourth embodiment, the state variation control unit 53B starts automatic scrolling if a hover manipulation has been performed by a finger FG for more than or equal to a prescribed time. If a hover manipulation (e.g., hover hold manipulation) of a finger is detected during the automatic scrolling, the state variation control unit 53B suspends the automatic scrolling. If hovering-out is detected during the suspension of the automatic scrolling, the state variation control unit 53B restarts automatic scrolling. The convergence speed of this automatic scrolling is equal to the second threshold speed.

If judging that the initial scroll speed of the inertial scrolling is lower than the second threshold speed, the state variation control unit 53B performs conventional inertial scrolling.

Operation of Portable Terminal 300 According to Embodiment 6

Figure 18:
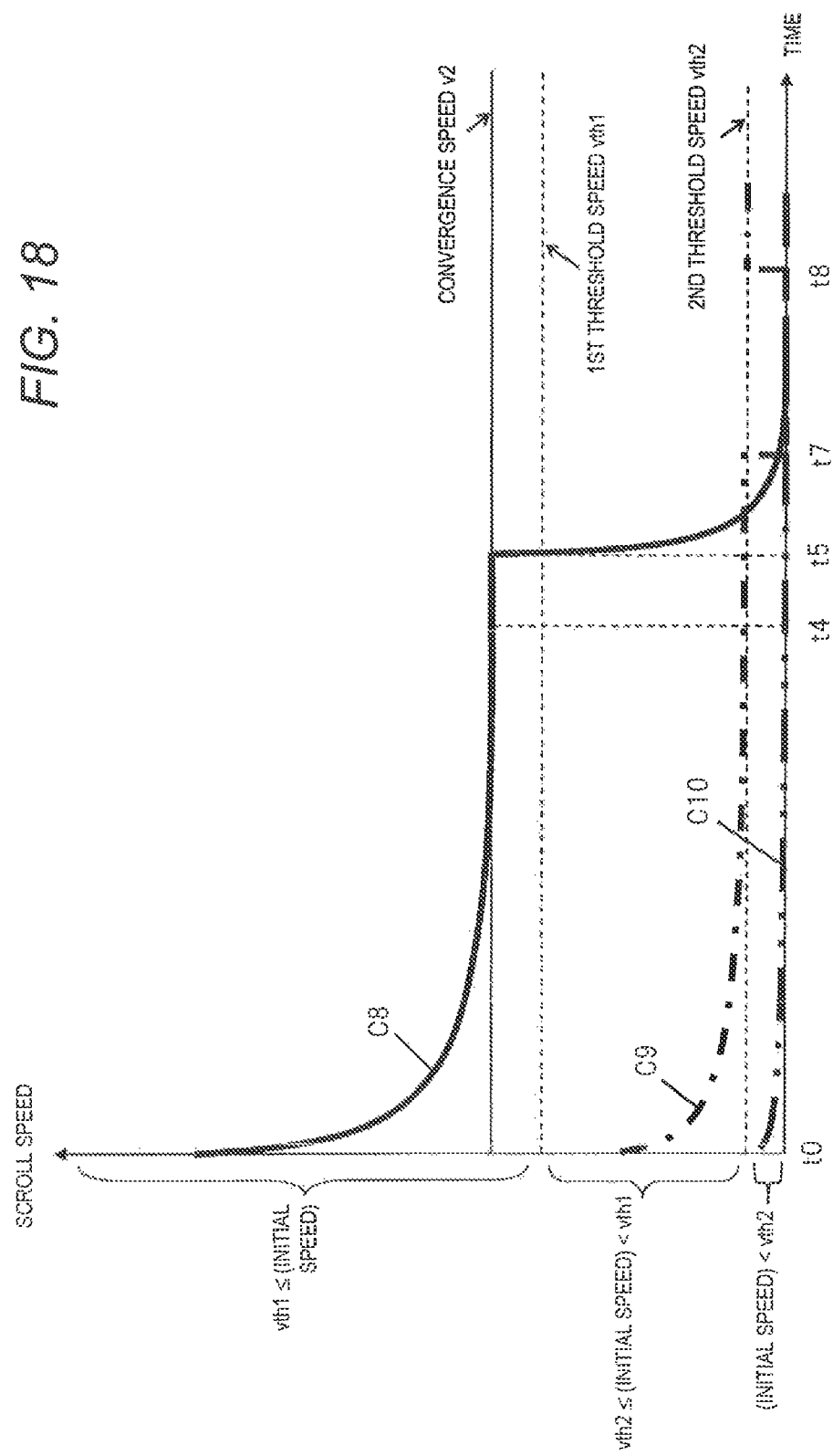
FIG. 18 is a graph showing how the scroll speed is varied with time in a sixth embodiment.
Figure 19:
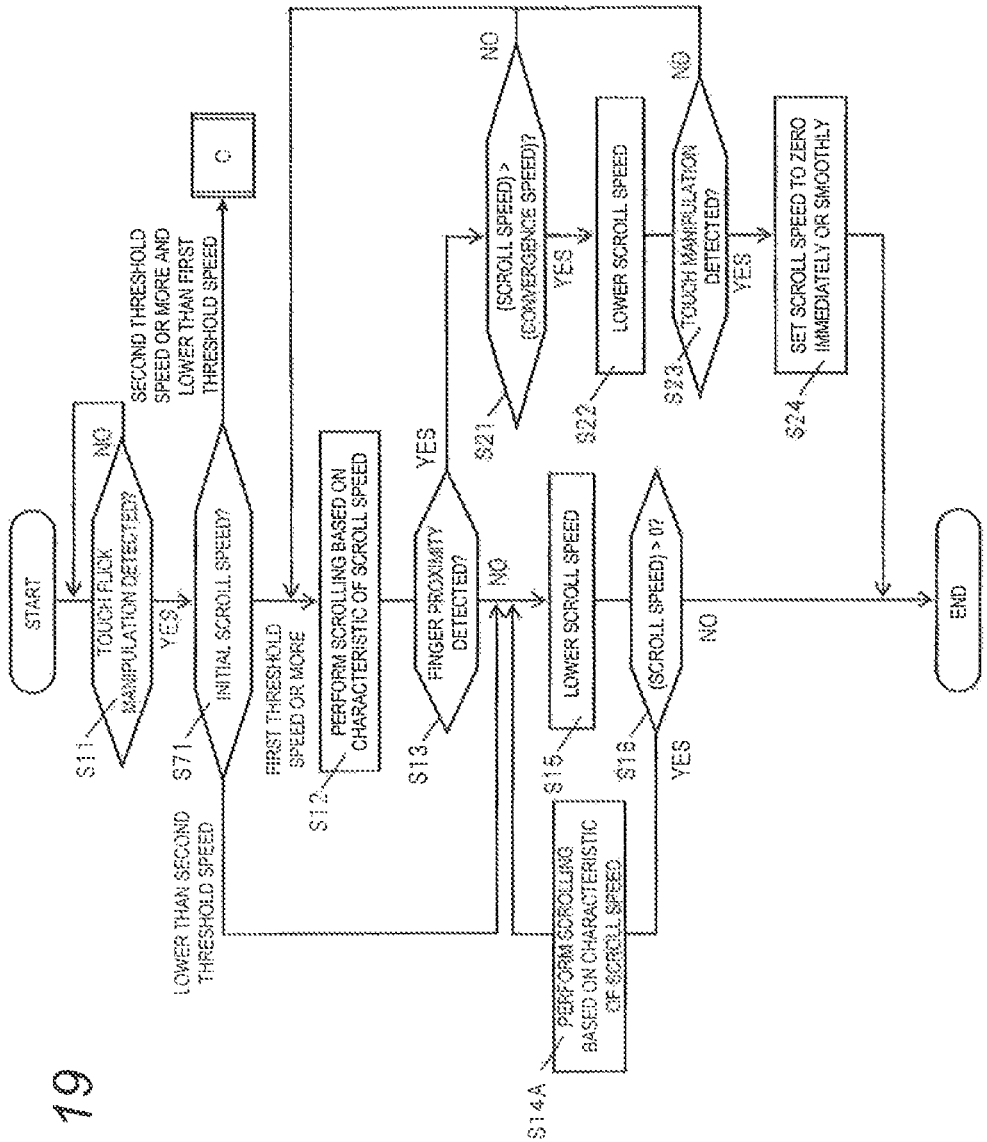
FIG. 19 is a flowchart showing how a portable terminal according to the sixth embodiment operates.

Next, how the portable terminal 300 according to this embodiment operates will be described with reference to FIGS. 18 and 19. FIG. 18 is a graph showing how the scroll speed is varied with time in the sixth embodiment. FIG. 19 is a flowchart showing how the portable terminal 300 according to the sixth embodiment operates.

In FIG. 18, time t0 is a time when a touch flick manipulation and hovering-in are detected simultaneously, time t4 is a time when the scroll speed v becomes equal to a convergence speed v2, time t5 is a time when hovering-out is detected, time t7 is a time when hovering-in of a finger FG is detected in the non-proximity state, and time t8 is a time when hovering-out is detected in the state that the hover manipulation is performed by the finger FG.

In the description of the flowcharts of FIG. 19, steps having the same ones in the flowchart of FIGS. 13-15 will be given the same reference symbols as the latter and descriptions therefor will be simplified or omitted. Only different steps will be described in detail.

A scroll curve C8 is the same as the scroll curve C4, A scroll curve C9 is the same as the scroll curve C6 except for the initial scroll speed, and a scroll curve C10 is the same as the scroll curve C0 except for the initial scroll speed. Therefore, descriptions of the scroll curve C8, C9, and C10 will be omitted.

Referring to FIG. 19, after the execution of step S11, at step S71 the state variation control unit 53B starts inertial scrolling and, furthermore, compares an initial scroll speed of the inertial scrolling with a prescribed first threshold speed and a prescribed second threshold speed.

If judging that the initial scroll speed of the inertial scrolling is higher than or equal to the first threshold speed (S71: "higher than or equal to the first threshold speed"), as in the second embodiment, while a hover manipulation of a finger FG is detected, the state variation control unit 53B suspends the inertial scrolling and decreases the scroll speed v gradually to a convergence speed v2 and, after that, keeps the scroll speed at the constant, convergence speed v2.

If judging that the initial scroll speed of the inertial scrolling is higher than or equal to the second threshold speed and lower than the first threshold speed (S71: "higher than or equal to the second threshold speed and lower than the first threshold speed"), as in the fourth embodiment, the state variation control unit 53B starts automatic scrolling if a hover manipulation has been performed by a finger FG for more than or equal to a prescribed time. If a hover manipulation (e.g., hover hold manipulation) of a finger is detected during the automatic scrolling, the state variation control unit 53B suspends the automatic scrolling. If hovering-out is detected during the suspension of the automatic scrolling, the state variation control unit 53B restarts automatic scrolling.

However, as mentioned above, in this embodiment, if the initial scroll speed of the inertial scrolling is higher than or equal to the second threshold speed, the convergence speed of the automatic scrolling is equal to the second threshold speed (see the scroll curve C9 shown in FIG. 18).

If judging that the initial scroll speed of the inertial scrolling is lower than the second threshold speed (S71: "lower than the second threshold speed"), the state variation control unit 53B performs conventional inertial scrolling.

In the above-described process, the portable terminal 300 according to the embodiment switches the scroll speed control method according to an initial scroll speed of inertial scrolling at the time of a touch flick manipulation of a finger FG. The portable terminal 300 according to the embodiment may select any of the scroll speed control methods of the above embodiments according to an initial scroll speed of inertial scrolling at the time of a touch flick manipulation of a finger FG.

With this measure, by the portable terminal 300 of the embodiment, flexible scrolling can be performed according to an initial scroll speed of inertial scrolling at the time of a touch flick manipulation of a finger FG so as to match an intention of the user.

Although the various embodiments have been described above with reference to the drawings, it goes without saying that the invention is not limited to those examples. It is apparent that those skilled in the art would conceive changes or modifications of the various embodiments or combinations of the various embodiments within the confines of the claims. And such changes, modifications, or combinations should naturally be included in the technical scope of the invention.

Figure 20:
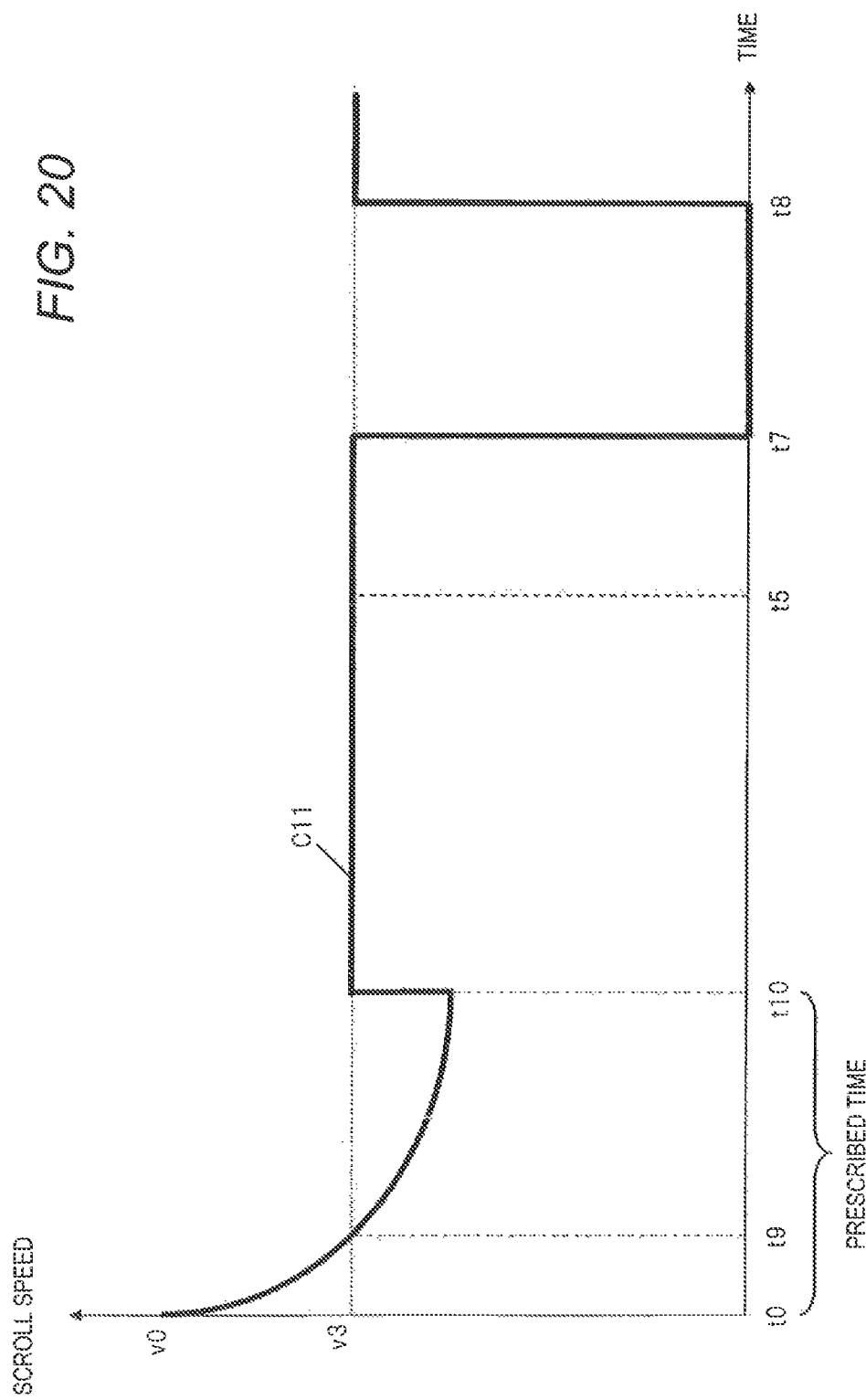
FIG. 20 is a graph showing how the scroll speed is varied with time in an embodiment that is the combination of the first, third and fourth embodiments.
Figure 21:
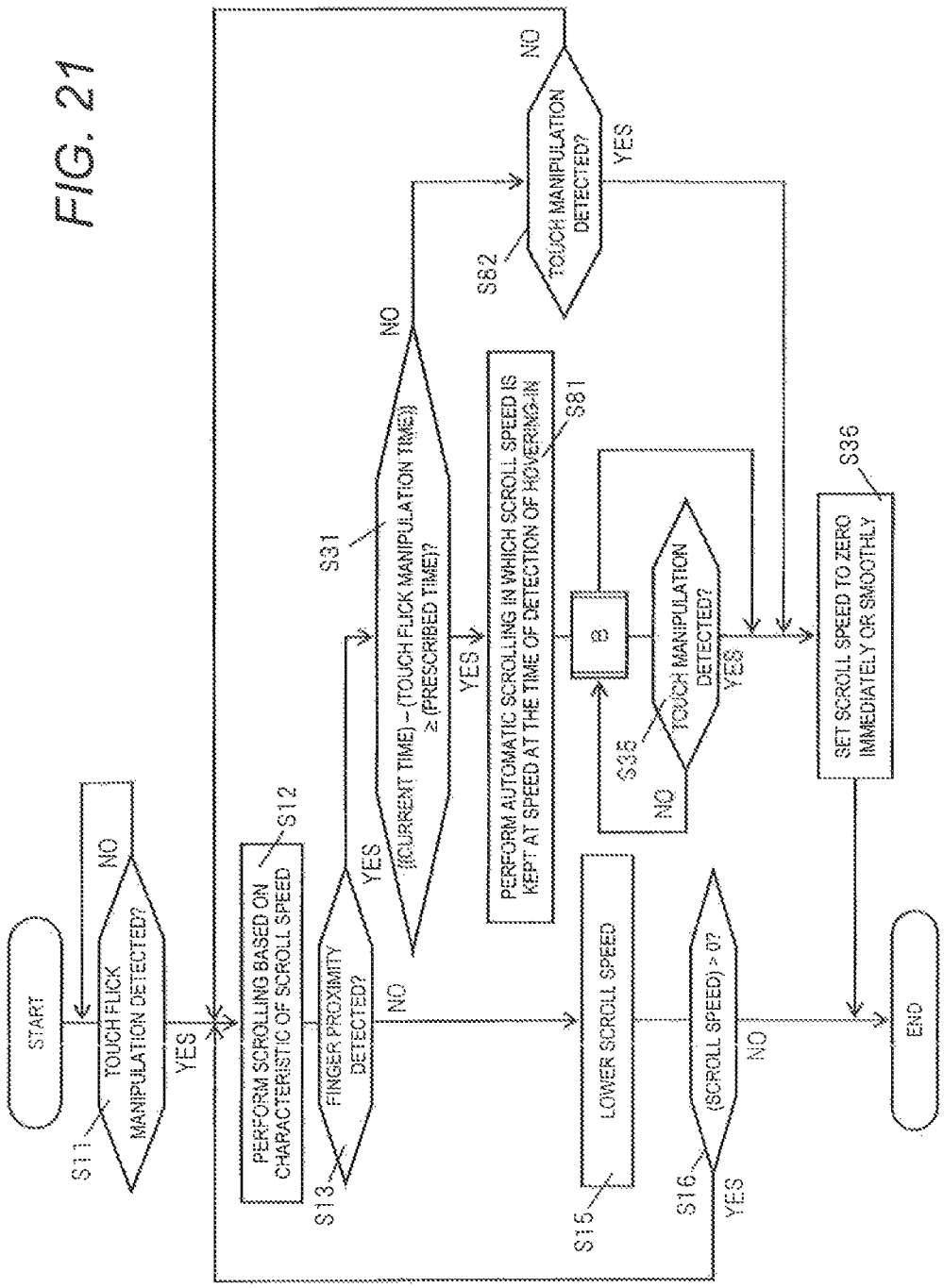
FIG. 21 is a flowchart showing how a portable terminal according to the embodiment that is the combination of the first, third and fourth embodiments operates.

How a portable terminal 300 according to an embodiment that is a combination of the first, third and fourth embodiments will be described with reference to FIGS. 20 and 21. FIG. 20 is a graph showing how the scroll speed is varied with time in the embodiment that is the combination of the first, third and fourth embodiments. FIG. 21 is a flowchart showing how the portable terminal 300 according to the embodiment that is the combination of the first, third and fourth embodiments operates.

In FIG. 20, time t0 is a time when a touch flick manipulation is detected, time t9 is a time when hovering-in of a finger FG is detected, time t10 is a time when a prescribed time has elapsed from time t0, time t5 is a time when hovering-out is detected, time t7 is a time when hovering-in of a finger FG is detected in the non-proximity state, and time t8 is a time when hovering-out is detected in the state that the hover manipulation is performed by the finger FG.

In the description of the flowchart of FIG. 21, steps having the same ones in the flowchart of FIGS. 4, 10, and 13-15 will be given the same reference symbols as the latter and descriptions therefor will be simplified or omitted. Only different steps will be described in detail.

In a scroll curve C11, at time t0, a touch flick manipulation of a finger FG is detected and inertial scrolling is started. Hovering-in is detected at time t9. At time t10 when a prescribed time has elapsed from time t0, the inertial scrolling is suspended and automatic scrolling is started in which the scroll speed will be kept at a speed at the time of the detection of the hovering-in (time t9).

Furthermore, in the scroll curve C11, since the automatic scrolling is performed from time t10, even if hovering-out is detected at time t5, the scroll speed is kept at the speed of time t9. When hovering-in of a finger FG is detected at time t7 in the non-proximity state, the automatic scrolling is suspended and the scroll speed is decreased to zero. When hovering-out is detected at time t8 in the state that the hover manipulation is performed by the finger FG, the automatic scrolling is restarted. The scroll speed immediately after the restart of the automatic scrolling is equal to the scroll speed of the automatic scrolling immediately before time t7.

Referring to FIG. 21, if judging that a finger FG has hovered in (S13: yes), the proximity state managing unit 25 informs the application 50B that a finger FG has hovered in. At step S31, the state variation control unit 53B judges, on the basis of time information that is output from the timer control unit 80, whether or not the finger FG is making a hover manipulation at the time point that is a prescribed time after the touch flick manipulation of the finger FG.

If judging that the finger FG is making a hover manipulation at the time point that is the prescribed time after the touch flick manipulation of the finger FG (S31: yes), at step S81 the state variation control unit 53B suspends inertial scrolling that has been performed at step S12 and starts automatic scrolling in which the scroll speed will be kept at a speed at time of the detection of the hovering-in of the finger FG. The steps to be executed after step S81 are the same as in the fourth embodiment (see FIG. 15), and hence descriptions therefor will be omitted.

On the other hand, if judging the finger FG is not making a hover manipulation at the time point that is the prescribed time after the touch flick manipulation of the finger FG (S31: no), at step S82 the state variation control unit 53B judges whether or not the finger PG has made a touch manipulation. If it is judged that the finger FG has made a touch manipulation (S82: yes), the process of the portable terminal 300 moves to step S36. If the finger FG has not made a touch manipulation (S82: no), the process of the portable terminal 300 returns to step S12.

With the above-described process, if it is detected that a finger FG is making a hover manipulation at the time point that is the prescribed time after a touch flick manipulation of the finger, the portable terminal 300 can start automatic scrolling in which the scroll speed will be kept at a speed at time of the detection of the hovering-in of the finger FG.

In the portable terminal 300 according to the fourth embodiment, automatic scrolling is suspended if a hover hold manipulation of a finger FG is detected during the automatic scrolling. Alternatively, automatic scrolling may be accelerated or decelerated instead of being suspended. For example, as shown in a schematic diagram of FIG. 22A, a portable terminal 300 may be provided which suspends, accelerates, or decelerates automatic scrolling depending on the position on the surface of the touch panel TP where a hover hold manipulation has been performed by a finger FG. FIG. 22A is a schematic diagram illustrating how the scroll speed is controlled according to the position on the surface of the touch panel TP where a hover hold manipulation has been performed by a finger FG.

For example, as shown in FIG. 22A, if a hover hold manipulation is performed by a finger FG at a certain height in the Z-axis direction over a region AR1 of the touch panel TP, the portable terminal 300 suspends automatic scrolling.

For example, if a hover hold manipulation is performed by a finger FG at a certain height in the Z-axis direction over a region AR2 of the touch panel TP, the portable terminal 300 accelerates automatic scrolling.

If a hover hold manipulation is performed by a finger FG at a certain height in the Z-axis direction over a region AR3 of the touch panel TP, the portable terminal 300 decelerates automatic scrolling.

Figure 22B:
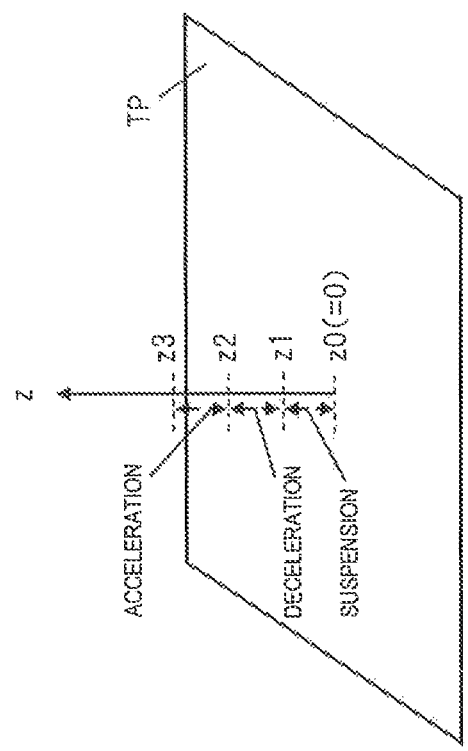
FIG. 22B is a schematic diagram illustrating how the scroll speed is controlled according to the height, with respect to the surface of a touch panel, where a finger has performed a hover hold manipulation.
Figure 22A:
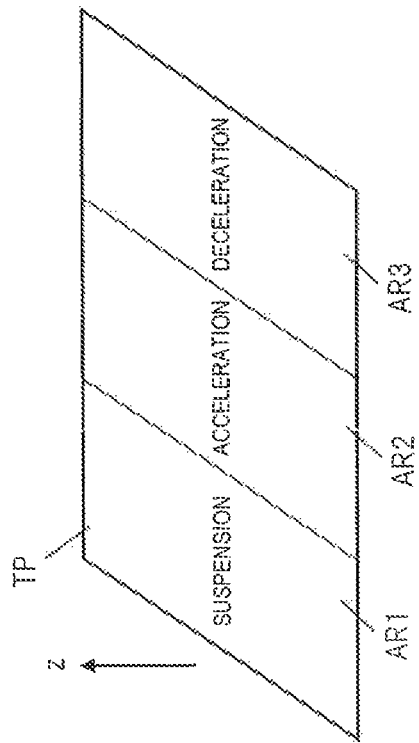
FIG. 22A is a schematic diagram illustrating how the scroll speed is controlled according to the position on the surface of a touch panel where a hover hold manipulation has been performed by a finger.

As shown in FIG. 22B, a portable terminal 300 may be provided which suspends, accelerates, or decelerates automatic scrolling depending on the height, with respect to the surface of the touch panel TP, where a finger FG has performed a hover hold manipulation.

For example, as shown in FIG. 22B, if a hover hold manipulation is performed by a finger FG in a height range from the surface of the touch panel TP (z coordinate: z0=0) to z1, the portable terminal 300 suspends automatic scrolling.

For example, if a hover hold manipulation is performed by a finger FG in a height range from z1 to z2, the portable terminal 300 accelerates automatic scrolling.

For example, if a hover hold manipulation is performed by a finger FG in a height range from z2 to z3, the portable terminal 300 decelerates automatic scrolling.

In each of the above embodiments, the portable terminal may accelerate or decelerate automatic scrolling if a hover flick manipulation is performed by a finger FG during the automatic scrolling. With this measure, the portable terminal can perform scrolling that matches an intention of the user in a flexible manner.

The present invention is applicable to and useful for, for example, a scrolling apparatus, a scrolling method, and a computer-readable medium storing a program which make it possible to easily scroll a content having a large display size without requiring repeated manipulations.

This application claims priority from Japanese Patent Application No. 2013-007502 filed on Jan. 18, 2013, the entire contents of which are incorporated herein by reference.

What is claimed is:

1. An electronic apparatus, comprising;
a display configured to display a content; and
a detector configured to detect contactless proximity of an object to the display and contact of the object to the display,
wherein, while the content scrolls on the display at gradually decreasing speeds, when the contactless proximity of the object to the display is detected and the contact of the object to the display is not detected, a scrolling speed of the content changes from the gradually decreasing speeds to a constant speed, which is faster than being stopped,
after the scrolling speed of the content has changed to the constant speed, while the contactless proximity of the object to the display is detected and the contact of the object to the display is not detected, the content scrolls on the display at the constant speed,
at or after the content starts scrolling on the display at gradually decreasing speeds, when the contactless proximity of the object to the display is detected for a predetermined period of time and the contact of the object to the display is not detected, the content continues to scroll on the display at the constant speed, even after the contactless proximity of the object to the display becomes not detected and the contact of the object to the display is not detected,
at or after the content starts scrolling on the display at gradually decreasing speeds, when any contact of the object to the display is detected, the content stop scrolling.

2. The electronic apparatus according to claim 1,
wherein a first scrolling speed variation per unit time from the gradually decreasing speeds of the content to the constant speed of the content, is sharper than a second scrolling speed variation per unit time of the gradually decreasing speeds of the content.

3. The electronic apparatus according to claim 1,
wherein, while the contact of the object to the display is not detected and the content scrolls at the gradually decreasing speeds, when the contactless proximity of the object to the display is detected and the contact of the object to the display is not detected, the scrolling speed of the content changes from the gradually decreasing speeds to the constant speed.

4. The electronic apparatus according to claim 1,
wherein, while the contactless proximity of the object to the display is not detected, the contact of the object to the display is not detected, and the content scrolls at the gradually decreasing speeds, when the contactless proximity of the object to the display is detected and the contact of the object to the display is not detected, the scrolling speed of the content changes from the gradually decreasing speeds to the constant speed.

5. The electronic apparatus according to claim 1,
wherein the object comprises a finger of a user.

6. The electronic apparatus according to claim 1,
wherein the object comprises a conductive stylus.

7. The electronic apparatus according to claim 1,
wherein, while the content scrolls in a direction on the display at gradually decreasing speeds, when the contactless proximity of the object to the display is detected and the contact of the object to the display is not detected, a scrolling speed of the content changes from the gradually decreasing speeds to the constant speed, after the scrolling speed of the content has changed to the constant speed, while the contactless proximity of the object to the display is detected and the contact of the object to the display is not detected, the content scrolls in the direction on the display at the constant speed.

8. The electronic apparatus according to claim 1, wherein, while the content scrolls at the gradually decreasing speeds to perform an inertial scrolling, when the contactless proximity of the object to the display is detected and the contact of the object to the display is not detected, the scrolling speed of the content changes from the gradually decreasing speeds to the constant speed.

9. The electronic apparatus according to claim 8, wherein the inertial scrolling is started by an object contact manipulation.

10. The electronic apparatus according to claim 9, wherein the object contact manipulation is a touch flick manipulation.

11. An content scrolling method for an electronic apparatus comprising a display configured to display a content; and a detector configured to detect contactless proximity of an object to the display and contact of the object to the display, the method comprising:
scrolling the content on the display at gradually decreasing speeds, which decreases gradually,
changing a scrolling speed of the content the gradually decreasing speeds to a constant speed, which is faster than being stopped, when the contactless proximity of the object to the display is detected and the contact of the object to the display is not detected, while the content scrolls at the gradually decreasing speeds,
scrolling the content at the constant speed, while the contactless proximity of the object to the display is detected and the contact of the object to the display is not detected, after the scrolling speed of the content has changed to the constant speed,
continuing the content to scroll on the display at the constant speed, even after the contactless proximity of the object to the display becomes not detected and the contact of the object to the display is not detected, when the contactless proximity of the object to the display is detected for a predetermined period of time and the contact of the object to the display is not detected, at or after the content starts scrolling on the display at gradually decreasing speeds,
stop scrolling the content, when any contact of the object to the display is detected, at or after the content starts scrolling on the display at gradually decreasing speeds.

12. The content scrolling method according to claim 11, wherein a first scrolling speed variation per unit time from the gradually decreasing speeds of the content to the constant speed of the content, is sharper than a second scrolling speed variation per unit time of the decreasing speeds of the content.

13. The content scrolling method according to claim 11, wherein, while the contact of the object to the display is not detected and the content scrolls at the gradually decreasing speeds, when the contactless proximity of the object to the display is detected and the contact of the object to the display is not detected, the scrolling speed of the content changes from the gradually decreasing speeds to the constant speed.

14. The content scrolling method according to claim 11, wherein, while the contactless proximity of the object to the display is not detected, the contact of the object to the display is not detected, and the content scrolls at the gradually decreasing speeds, when the contactless proximity of the object to the display is detected and the contact of the object to the display is not detected, the scrolling speed of the content changes from the gradually decreasing speeds to the constant speed.

15. The content scrolling method according to claim 11, wherein the object comprises a finger of a user.

16. The content scrolling method according to claim 11, wherein the object comprises a conductive stylus.

17. The content scrolling method according to claim 11, wherein, while the content scrolls in a direction on the display at gradually decreasing speeds which decreases gradually, when the contactless proximity of the object to the display is detected and the contact of the object to the display is not detected, a scrolling speed of the content changes from the gradually decreasing speeds to the constant speed,
after the scrolling speed of the content has changed to the constant speed, while the contactless proximity of the object to the display is detected and the contact of the object to the display is not detected, the content scrolls in the direction on the display at the constant speed.

18. The content scrolling method according to claim 11, wherein, while the content scrolls at the gradually decreasing speeds to perform an inertial scrolling, when the contactless proximity of the object to the display is detected and the contact of the object to the display is not detected, the scrolling speed of the content changes from the gradually decreasing speeds to the constant speed.

19. The content scrolling method according to claim 18, wherein the inertial scrolling is started by an object contact manipulation.

20. The content scrolling method according to claim 19, wherein the object contact manipulation is a touch flick manipulation.

* * * * *